United States Patent [19]

Sakaue et al.

[11] 4,249,704

[45] Feb. 10, 1981

[54] AUTOMATIC TAPING APPARATUS

[75] Inventors: Yoshikazu Sakaue; Hisaichi Maruyama, both of Amagasaki, Japan

[73] Assignee: Mitsubishi Denki Kabushiki Kaisha, Tokyo, Japan

[21] Appl. No.: 17,327

[22] Filed: Mar. 5, 1979

[30] Foreign Application Priority Data

Apr. 25, 1978 [JP] Japan .................................. 53-49525
Jul. 19, 1978 [JP] Japan .................................. 53-88584

[51] Int. Cl.³ .......................................... B65H 81/08
[52] U.S. Cl. ................................. 242/7.23; 156/425; 242/7.02
[58] Field of Search .................... 242/7.23, 7.21, 7.08; 156/189, 425, 428, 432, 446; 140/92.2, 92.1

[56] References Cited

U.S. PATENT DOCUMENTS

| | | | |
|---|---|---|---|
| 3,166,104 | 1/1965 | Foley, Jr. et al. | 140/92.2 |
| 3,616,061 | 10/1971 | Carter | 242/7.23 |
| 3,734,421 | 5/1973 | Karlson et al. | 242/7.21 |
| 3,940,073 | 2/1976 | Haeusler et al. | 242/7.08 |
| 4,145,740 | 3/1979 | McClean et al. | 156/425 |

*Primary Examiner*—Billy S. Taylor
*Attorney, Agent, or Firm*—Robert E. Burns; Emmanuel J. Lobato; Bruce L. Adams

[57] ABSTRACT

A rotary annulus holding a tape feed reel is moved along a taped body while revolving about the body in a plane normal to its longitudinal axis to wind a tape around the body under the control of a small-scaled computer. The computer stores many coordinate points describing the longitudinal axis of the body and, assuming that the longitudinal axis approximates to a series of broken lines defined by the coordinate points, it calculates a command position of the annulus from every three selected coordinate points adjacent to its actual position, a command speed of rotation and command angles of rotation of the annulus required for keeping its plane of revolution normal to the longitudinal axis of the body at the command position of the annulus.

9 Claims, 19 Drawing Figures

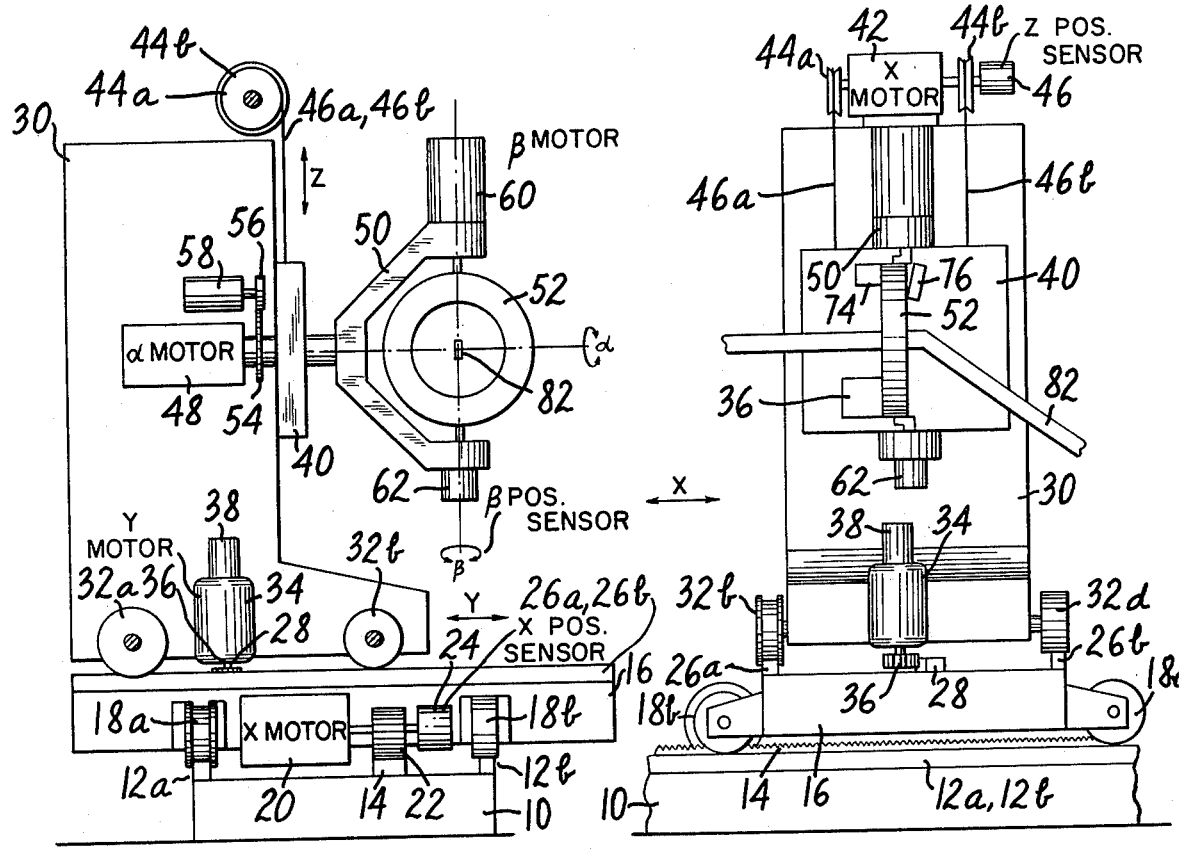
FIG. 1A
FIG. 1B
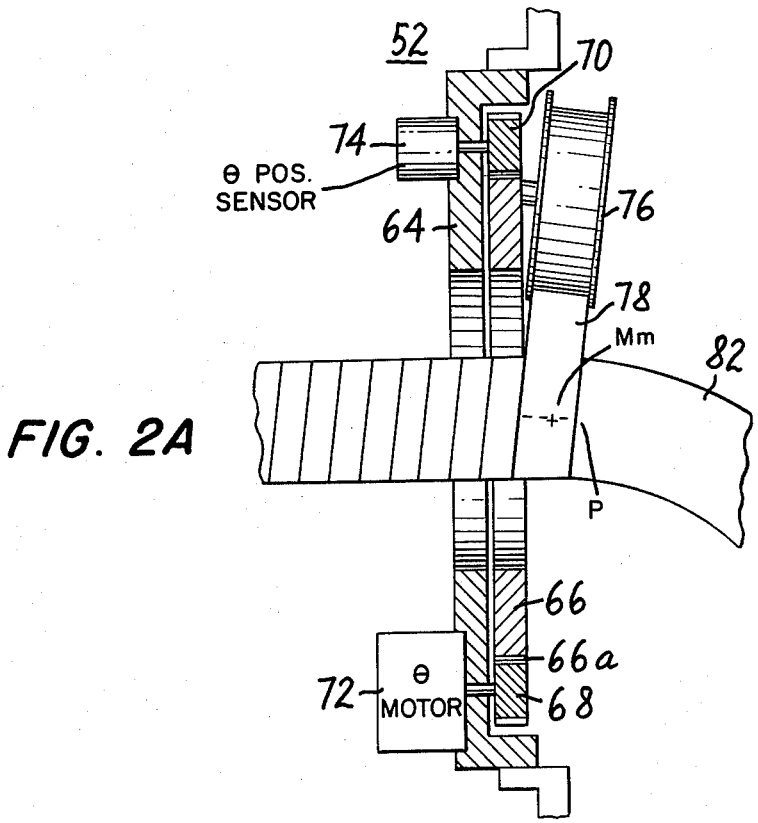
FIG. 2A

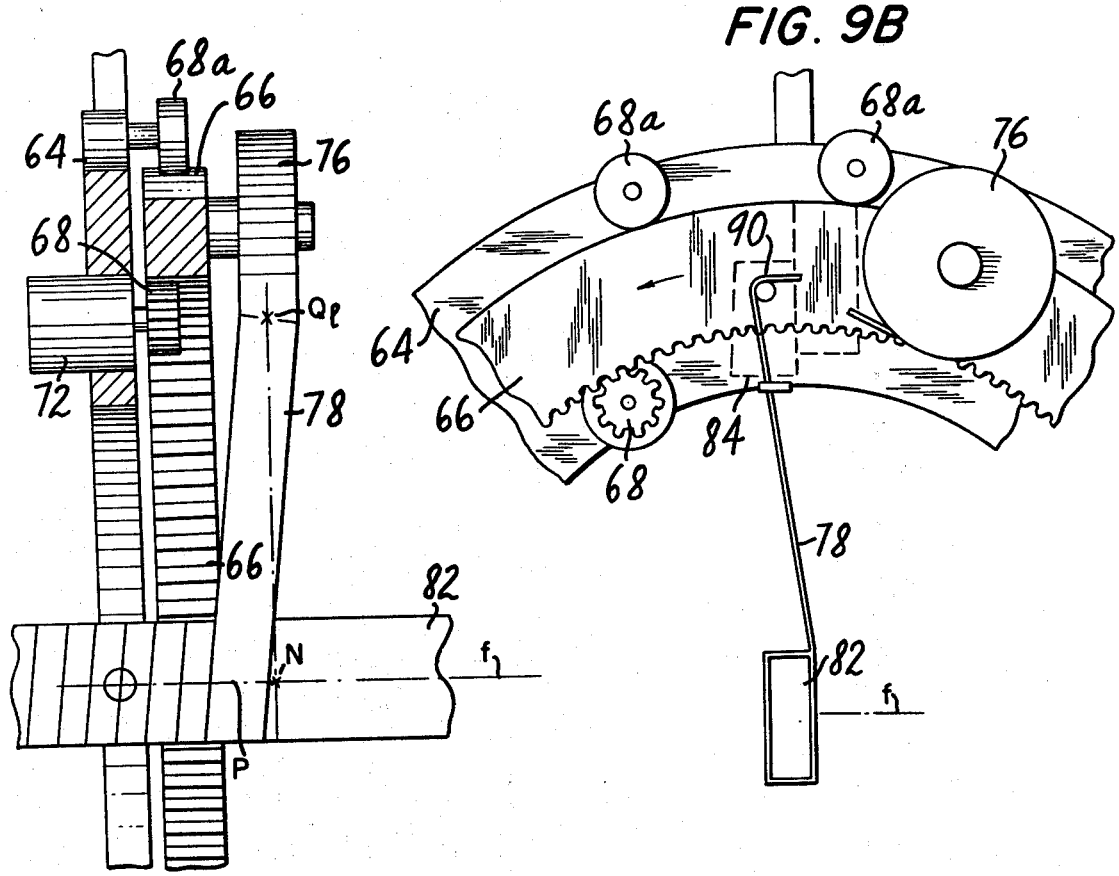
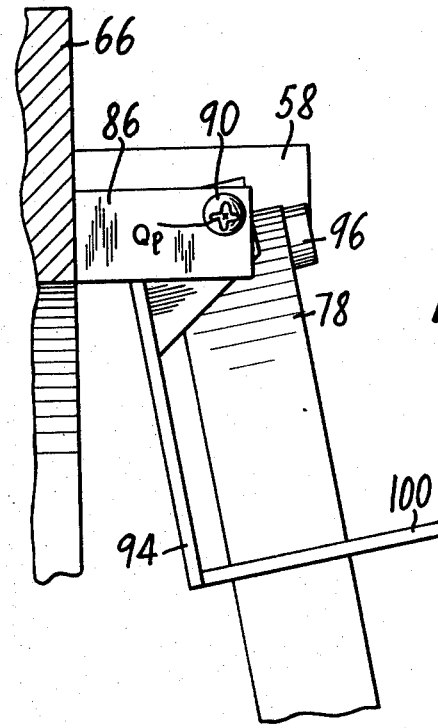
FIG. 9B
FIG. 9A
FIG. 10A

AUTOMATIC TAPING APPARATUS

BACKGROUND OF THE INVENTION

This invention relates to an automatic taping apparatus for winding automatically a tape-shaped material around a long body including not only straight portions but also curved portions.

Upon winding the tape-shaped material around long bodies having the substantially uniform cross section throughout their length after having been bent into complicated shapes, the substantial portion of the taping operation has previously relied on human power and automated machines therefor have been practically employed only with the straight portions of such bodies. In other words, those automated machines have been only employed in taping simple shapes. Also it has been sometimes practiced to secure a taping machine to an associated body to be taped such as a coil and tape the body while keeping the direction of the machine coinciding with that of the body.

Therefore the so-called automatic taping apparatus have not been previously generalized in the field of the tape winding technique. In view of the latest progress of numerical machine-tool control systems, it may be expected to apply those control systems to taping apparatus.

The description will now be briefly made in conjunction with the operating procedure of numerical control machine tools. First, it is required to look over the manufacturing drawings specified for the particular workpiece to prepare numerical expressions describing loci along which control elements of an associated machine tool are destined to travel. For example, if the workpiece should be machined into a straight shape, the numerical expressions may be of the first order. On the other hand, higher order expressions are required for machining the workpiece into a curved shape. Alternatively, one may read out coordinates of several points on each of the loci referring to the particular three-dimensional orthogonal coordinate system. Then the numerical expressions or read data enter a large-scaled digital computer where each of the loci is divided into a multiplicity of plots each having a minute length of a few tenths of one millimeter or a few millimeters and a speed of movement of each control element of the machine tool in each plot is calculated with respect to a different one of control axes or X, Y and Z axes of the three-dimensional orthogonal coordinate system from X, Y and Z coordinates of the plots. If the machine tool is of an arm structure rotatable about a predetermined point then it is advantageous to transform the three-dimensional orthogonal coordinate system to a three-dimensional polar coordinate system including two angular coordinates and a radial coordinate. The digital computer may automatically perform this operation of transformation through the utilization of an automctic program such as an "APT" (which is the abbreviation for an "automatic programming tool") prepared to be generally used for this purpose.

Command position or movement values for the incremental minute plots calculated by the digital computer as above described are successively delivered to a paper tape and punched on the latter. Then the punched paper tape is passed through a tape reader included in a numerical control mechanism for the machine tool thereby to enter the command values into the machine tool.

On the other hand, the machine tool responds to data written in the paper tape to control each of the control elements with respect to the control axes to travel orderly and successively toward the minute plots one after another with predetermined incremental time intervals. This results in each control element of the machine tool traveling along the associated locus first read out from the manufacturing drawings.

It is summarized that, from the numerical expressions describing the loci for command traveling points read out from the manufacturing drawings the large-scaled digital computer calculates a command position or movement value for each of the minute plots and for each of the control elements after which the associated numerical control type machine tool is operated in resposes to the command values entered thereinto.

However, upon applying the numerical machine tool control system as above described to taping apparatus, the various disadvantages are caused. A first one of the disadvantages is the necessity of transferring an enormous quantity of numerical data calculated by a large-scaled digital computer to a taping apparatus involved. A second one thereof is the fact that bodies to be taped are curved. More specifically, the curved bodies are not, in many cases, completed substantially as described in the manufacturing drawings involved. Similarly, bodies to be taped and which are manufactured in accordance with the same manufacturing drawings are more or less different from one to another thereof. This results in the necessity of preparing control data for each of the bodies to be taped which is inevitably attended with a troublesome procedure of measuring a shape of each of the bodies after the completion of its bending operation, preparing control data for each of the measured bodies by operating a large-scaled digital computer and transferring the control data to the taping apparatus.

Accordingly it is an object of the present invention to provide a new and improved automatic taping apparatus operative in simple manner by itself without using a large-scaled digital computer and also without preparing an enormous quantity of command control values for individual minute plots on a body to be taped and for respective control elements.

SUMMARY OF THE INVENTION

The present invention provides an automatic taping apparatus operative to wind automatically a tape around a taped body while calculating all control data required for the apparatus only from information concerning three-dimensional coordinates of a multiplicity of points describing the central axis passing through cross sections of the taped body, referring to a three-dimensional orthogonal coordinate system, by using a small-sized digital computer disposed on the apparatus. The automatic taping apparatus comprises a rotary member revolving around the taped body and rotatable about each of two radial orthogonal axes thereof, taped feed means disposed on the rotary member to feed a winding tape to the taped body, positional control means for controlling a spatial position of the taped body, angular control means for controlling both the revolution of the rotary member and angles of rotation thereof about the radial axes, memory means for storing therein shape data of the taped body as a multiplicity of sets of coordinates $\{(X_1, Y_1, Z_1), (X_2, Y_2, Z_2), (X_3, Y_3,$ $Z_3) \ldots, (X_n, Y_n, Z_n) \ldots$} referring to a three-dimensional orthogonal coordinate system, computer means for reading successively the shape data of the taped body out from the memory means and calculating control signals for controlling the spatial position of the taped body and the revolution and angles of rotation thereof with respect to associated control axes to deliver the control signals to the positional and angular control means.

BRIEF DESCRIPTION OF THE DRAWINGS

The present invention will become more readily apparent from the following detailed description taken in conjunction with the accompanying drawings in which:

FIG. 1A is a schematic side elevational view of one embodiment according to the automatic taping apparatus of the present invention;

FIG. 1B is a schematic front elevational view of the arrangement shown in FIG. 1B;

FIG. 2A is a front elevational sectional view of the details of the taping head shown in FIGS. 1A and 1B;

FIG. 9A is a fragmental front elevational view of one portion of a modification of the taping head shown in FIGS. 2A and 2B illustrating the positional relationship among a winding start point Q for a winding tape, a machine center M and a contact twisting point P;

FIG. 9B is a fragmental side elevational view of the arrangement shown in FIG. 9A;

FIGS. 10A and 10B are respectively a front and a side elevational view of the automatic taping-angle optimizing mechanism schematically shown in FIG. 9B;

DESCRIPTION OF THE PREFERRED EMBODIMENTS

Figure 2B:
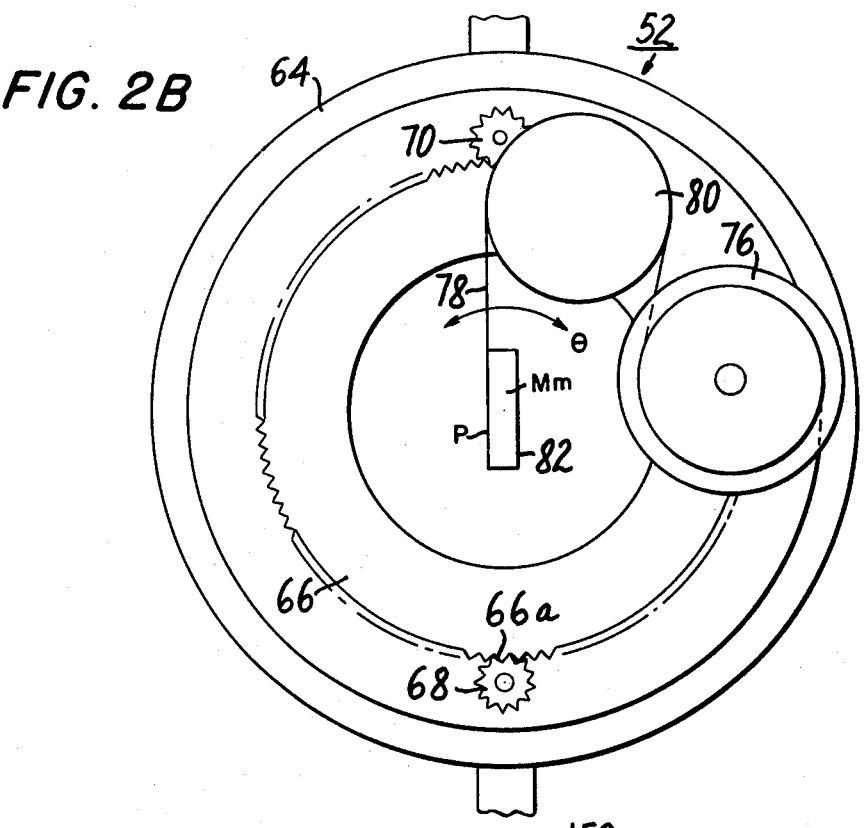
FIG. 2B is a side elevational sectional view of the arrangement shown in FIG. 2A.

Referring now to FIGS. 1A and 1B of the drawings, there is illustrated one embodiment according to the automatic taping apparatus of the present invention. The arrangement illustrated comprises a horizontal bedplate 10 including a pair of X rails 12a and 12b disposed at opposite edges thereof extending along an X axis or in a direction shown by the double-headed arrow labelled X in FIG. 1B, and an X rack 14 disposed thereon to run in parallel to the X rails 12a, and 12b, and an X carrier 16 disposed above the bedplate 10 to be movable along the X axis. The X carrier 16 includes four wheels 18a, 18b, 18c and 18d rotatably supported on the lower side as viewed in FIGS. 1A and 1B facing the bedplate 10 so that the wheels 18a and 18c are adapted to roll along the X rail 12a, although the wheel 18c is not illustrated, while the wheels 18b and 18d are adapted to roll along the X rail 12b. The lower side of the X carrier 16 fixedly supports a reversible electric motor or a servomotor 20 for the X axis which is located between the wheels 18a, 18c and 18b and 18d and includes a horizontal rotary shaft fixedly extending through an X pinion 22 meshing the X rack 14 and having a positional sensor 24 for the X axis mounted to the free end thereof. Thus when driven, the servomotor 20 moves the X carrier 16 along the X axis in a direction as determined by the sense of rotation thereof. The X positional sensor 24 serves to sense a position along the X axis of the X carrier 16. The X carrier 16 includes a pair of Y rails 26a and 26b disposed at opposite edges thereof on the upper side extending along an Y axis orthogonal to the X axis or in a direction shown by the double-headed arrow labelled Y in FIG. 1A, and an Y rack 28 disposed between the Y rails 26a and 26b on the upper side thereof to run in parallel to those rails.

Then a Y tower 30 is disposed above the X carrier 16 to be movable in the direction Y. Like the X carrier 16, the Y tower 30 rotatably supports one pair of wheels 32a and 32b rolling along the Y rails 26a and the other pair of wheels 32c and 32d rolling along the Y rail 26b although the wheel 32c is not illustrated, and also fixedly supports a reversible electric motor or a servomotor 34 for the Y axis. The Y servomotor 34 includes a vertical rotary shaft on which a Y pinion 36 and a positional sensor 38 for the Y axis are mounted on opposite sides of the motor 34. The Y pinion 36 meshes the Y rack 28 on the X carrier 16.

Therefore the Y motor 34 is driven to move the Y tower 30 in the direction Y through the Y pinion 36 meshing with the Y rack 28 and the wheels rolling along the Y rails 26a and 26b. The Y positional sensor 38 is operative to sense a position along the Y axis of the Y tower 30.

The Y tower 30 includes an upper vertically extending portion, a Z carrier 40 slidably disposed on one of those wall surfaces of the upper portion normal to the Y axis, in this case, the righthand wall surface as viewed in FIG. 1A and a reversible electric motor or a servomotor 42 for a Z axis suitably disposed on the top surface of the upper portion. The Z axis is shown at the double headed arrow Z in FIG. 1A and orthogonal to both the X and Y axes. The servomotor 42 includes a rotary shaft horizontally extending from both sides thereof, a pair of winding or hoisting wheels 44a and 44b mounted on the rotary shaft on opposite sides of the motor 42 and a positional sensor 46 for the Z axis mounted to one end, in this case, the righthand end as viewed in FIG. 1B of the rotary shaft. The two lengths of winding or hoisting wire 46a and 46b are connected at one end to the respective winding wheels 44a and 44b and at the other ends to the Z carrier 40. Therefore, when driven, the motor 42 winds up and unwinds the lengths of wire 46a and 46b thereby to raise and lower the Z carrier 40 on the abovementioned wall surface of the upper tower portion, that is to say, in a direction shown at the double-headed arrow labelled Z in FIG. 1A as the case may be. In other words, the servomotor 42 is operative to move the Z carrier 40 in the direction Z while the positional sensor 46 serves to sense a position along the Z axis of the Z carrier 42.

As best shown in FIG. 1A, a reversible electric motor or a servomotor 48 is disposed within the Y tower 40 by having a horizontal rotary shaft rotatably extending through the center of the Z carrier 40 and connected at one end to the middle portion of a generally semi-circular support arm 50. When driven, the motor 48 is driven to rotate the support arm 50 and therefore a taping head of circular cross section generally designated by the reference numeral 52 and connected to the support arm 50 in the manner as shown in FIG. 1A. A driving gear 54 is mounted on the rotary shaft of the motor 48 and meshes with a driven gear 56 that is connected to an $\alpha$ positional sensor 58 through a rotary shaft thereof.

The taping head 52 is supported on the support arm 50 so as to be rotatable about both the longitudinal axis of the motor 48 shaft which is called hereinafter an $\alpha$ axis and a $\beta$ axis orthogonal to the $\alpha$ axis. Thus the $\alpha$ and $\beta$ axes are parallel to the Y and Z axes respectively. In order to rotate the taping head 52 about the $\beta$ axis, a reversible electric motor or a servomotor 60 is disposed on the outside of one end, in this case, the upper end portion as viewed in FIG. 1A of the support arm 50 and includes a rotary shaft rotatably extending through the upper end portion of the support arm 50 with an end thereof connected to the taping head 52. Also a $\beta$ positional sensor 62 is disposed on the outside of the other or lower end portion of the arm 50 and includes a rotary shaft rotatably extending through that end arm portion to be diametrically opposite to that of the $\beta$ motor 60 with an end thereof connected to the head 52. The $\beta$ positional sensor 62 serves to sense an angular position about the $\beta$ axis of the taping head 52.

FIGS. 2A and 2B show the details of the taping head 52. The arrangement illustrated comprises a tray-shaped supporting disc 64 including a central circular opening, and a rotary supporting member 66 in the form of a circular annulus disposed within a shallow recess of the disc 64 and including an outer toothed periphery 66a and an inner periphery axially aligned with that of the disc 64. Also a pair of diametrically opposite pinions 68 and 70 are disposed within the shallow recess of the disc 64 to mesh with the toothed priphery 66a of the rotary annulus 66. A reversible electric motor or a servomotor 72 for a $\theta$ axis coinciding with the longitudinal axis of the disc 74 annulus 64 and 66 respectively is fixedly secured to that side of the disc 64 remote from the annulus 66 to be opposite to the pinion 68 and includes a rotary shaft rotatably extending through the adjacent portion of the disc 64 and connected to the center of the pinion 68. Similarly, a $\theta$ positional sensor 74 is fixedly secured to the disc 64 to be operatively connected to the pinion 70. The $\theta$ axis is parallel to the X axis. When driven, the $\theta$ motor rotates the annulus 66 through the pinion 68 while the $\theta$ positional sensor 74 senses an angle of rotation or angular position about the $\theta$ axis of the annulus 66 through the pinion 70.

As best shown in FIG. 2A, a tape feed reel 76 is fixed to the rotary supporting annulus 66 to be tilted at a predetermined angle to the latter. The feed reel 76 has wound thereon a length of taped-shaped material 78 which is simply called "a tape" hereinafter. The tape 78 fed from the feed reel 76 is trained over a tensioning roll 80 also fixedly secured to the supporting annulus 66 to be close to the reel 76 and then delivered in its slightly tensioned state to a taped body 82 located coaxially with the central axis of the rotary annulus 66 in order that the tape 78 is wound around the object 82 in the manner as will be apparent hereinafter. The taped body 82 is a long body worked into a straight or a curved shape and having any desired cross section and suitably fixed. In the example illustrated, the taped body 82 is shown in FIGS. 1A and 2B as being of a rectangular cross section.

From the foregoing it will readily be understood that the taping head 52 can be moved to any desired spatial position through the operation of the X, Y and Z motors 20, 34 and 42 respectively, and that the X, Y and Z positional sensors 24, 38 and 46 respectively can sense positions of the moved head 52 relative to the X, Y and Z axes respectively. The head 52 at its moved position can be rotated about each of the $\alpha$ and $\beta$ axes through the operation of the associated motor 48 or 60 and the toothed annulus 66 of the head 52 can be rotated about the $\theta$ axis through the operation of the $\theta$ motor 72 while the $\alpha$, $\beta$ and $\theta$ positional sensors 58, 62 and 74 respectively sense associated angular positions of the head 52.

Each of the X, Y, Z, $\alpha$, $\beta$ and $\theta$ positional sensors may be a synchro-resolver, a potentiometer or the like.

Figure 3:
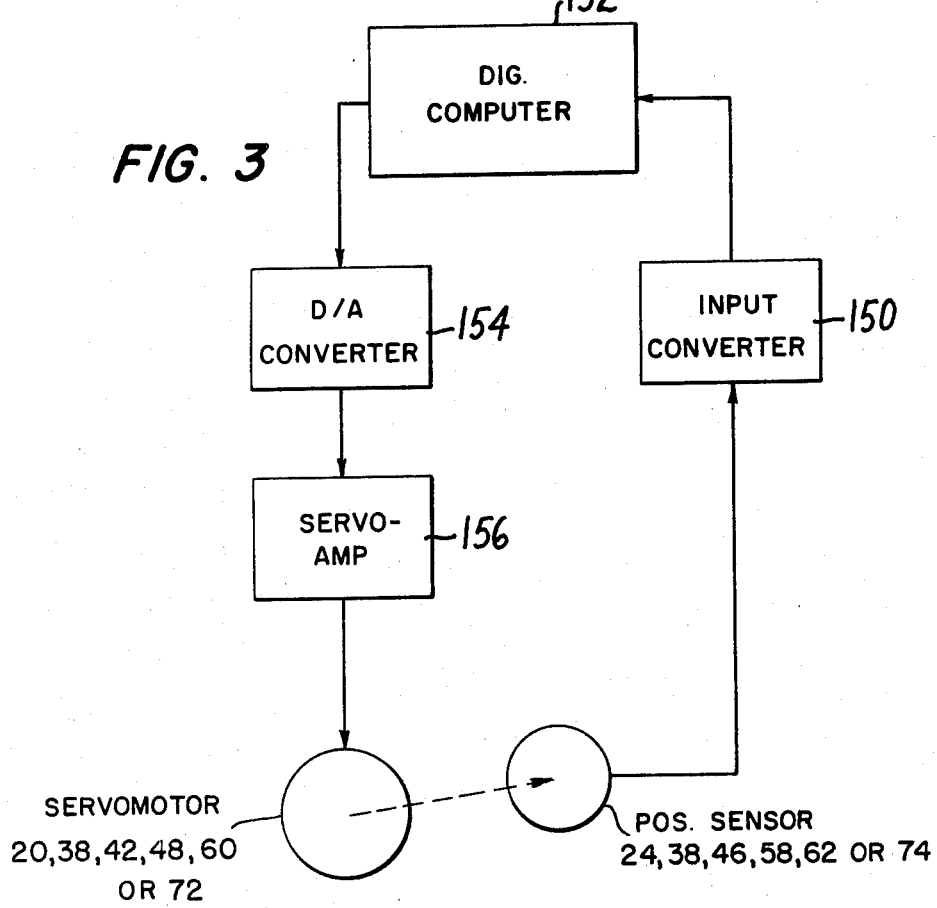
FIG. 3 is a block diagram of control means for controlling electric motors for the respective control axes shown in FIGS. 1A, 1B, 2A and 2B.

FIG. 3 is a block diagram of a control unit for controlling each set of a different one of the servomotors for the respective axes and the associated positional sensor as shown in FIGS. 1A, 1B, 2A and 2B, for example, a set of the X motor 20 and the X positional sensor 24. In the arrangement illustrated in FIG. 3, a position of the rotary head 52 sensed by the particular positional sensor is entered via an input converter 150 into a small-sized digital computer 152 and a digital control signal from the digital computer 152 is applied to a digital-to-analog converter 154 where the digital control signal is converted to a corresponding analog control signal. The analog contol signal from the converter 154 is amplified by a servo-amplifier 156 and then supplied to the associated motor to control the latter.

Figure 4:
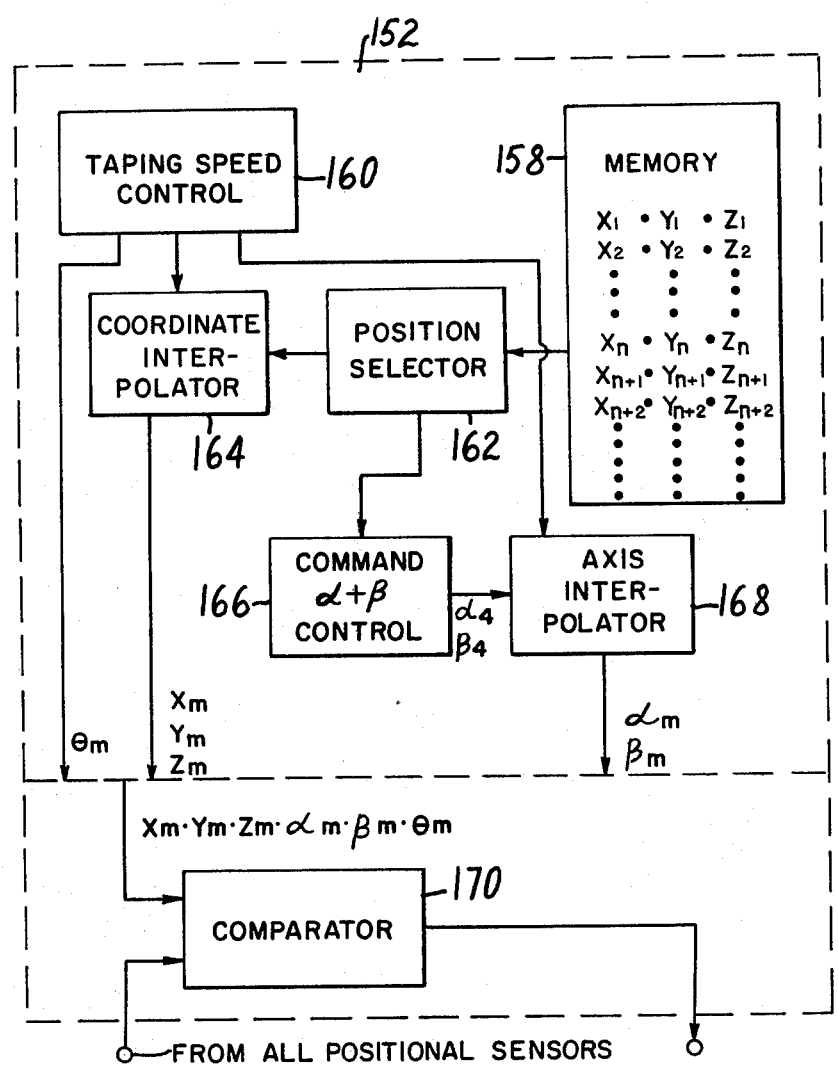
FIG. 4 is a block diagram of the details of the small-sized digital computer shown in FIG. 3.

The small-sized computer 152 may comprise a microcomputer having a storage capacity of about 2,000 words, for example and performing calculations in accordance with a program as shown in a flow chart of FIG. 4.

As shown in FIG. 4, the small-sized digital computer or micro-computer 152 includes a memory 158 having stored therein a multiplicity of sets of X, Y and Z coordinates $(X_1, Y_1, Z_1)$, $(X_2, Y_2, Z_2)$ . . . $(X_n, Y_n, Z_n)$, $(X_{n+1}, Y_{n+1}, Z_{n+1})$, $(X_{n+2}, Y_{n+2}, Z_{n+2})$, . . . for points on the central axis of the taped body 82 to describe the shape of the latter referring to a three-dimentional orthogonal coordinate system including an X, a Y and a Z axis identical or parallel to the X, Y and Z axes as described above in conjunction with FIGS. 1A and 1B. The digital computer 152 further includes a taping speed control mechanism 160 for controlling a taping speed, and a position selector 162 connected to the memory 158 to read selectively and successively sets of X, Y and Z coordinates relating to the actual position of the taping head 52 from the memory 158. The selected sets of the X, Y and Z coordinates from the position selector 162 are applied to a coordinate interpolator 164. The coordinate interpolator 164 also receives a command operating signal from the control mechanism 160 to interpolate command coordinates $X_m$, $Y_m$ and $Z_m$ to which the rotary annulus 66 of the taping head 52 is to be moved for a unit time. The sets of coordinates selected by the position selector 162 are also applied to a command α and β generator 166 where command control values concerning the α and β axes are generated. Those command control values for the α and β axes are applied to an axis interpolator 168 with a proportional factor from the speed control mechanism 160 to interpolate angles $\alpha_m$ and $\beta_m$ through which the rotary annulus 66 is to be rotated about the α and β axes respectively for the next succeeding unit time.

Those command values $X_m$, $Y_m$, $Z_m$, $\alpha_m$ and $\beta_m$ are supplied to a comparator 170 with the command taping speed $\theta_m$ from the speed control mechanism 160. The comparator 170 is operative to compare the command values $X_m$, $Y_m$, $Z_m$, $\alpha_m$, $\beta_m$ and $\theta_m$ with the actual values from the positional sensors 24, 38, 46, 58, 62 and 72 respectively to produce control signals for driving the X, Y, Z, α, β and θ motors 20, 34, 42, 48, 60 and 72 respectively.

From the foregoing it is seen that the components 158 through 168 form a mechanism by which the command values are generated while the comparator 170 forms another mechanism by which the control signals for driving the respective motors are generated through the comparison of the command values with the actual values. Therefore control means as shown in FIG. 4 can be roughly sorted into a pair of control blocks for generating the command signals and the driving signals for driving the individual motors respectively.

The operation of the automatic taping apparatus of the present invention as shown in FIGS. 1 through 4 will now be described in conjunction with FIGS. 5 through 8 and on the assumption that the intersection of the α, β and θ axes always coincide with a point where a winding tape is initiated to be twisted around a taped body. For a better understanding of the operation of the present invention, the description will be first made in conjunction with the control of the revolution of the rotary supporting annulus 66 about the θ axis.

The tape feed reel 76 has wound thereon the winding tape 78 whose length is, for example, on the order of several tens of meters and the tape 78 leaving the reel 76 must revolve about the central longitudinal axis of the taped body 82 in a plane normal to that axis. Under these circumstances, the tape 78 can be neatly wound around the taped body 82 by maintaining it in slight tensioned state by means of the tensioning roll 80 during the winding operation. Thus it is required to revolve the rotary annulus 66 holding the tape feed reel 76 and the tensioning roll 72 about the central longitudinal axis of the taped body 82 in a plane normal to that axis. Accordingly, the control of a position of revolution of the rotary annulus 66 is called hereinafter the "θ axis control".

In order to maintain the plane of revolution of the rotary annulus 66 normal to the central longitudinal axis of the taped body 82 which is curved in a single plane, one may only control a single axis parallel to an axis of curvature about which the taped object 82 is curved, the axis of curvature being normal to the single plane. For example, assuming that, with the central longitudinal axis of the taped body 82 directed leftwards and rightwards, the shape thereof varies in front and in rear, the plane of revolution of the rotary annulus 66 about the θ axis must turn to the forward and rearward directions about the vertical axis in just correspondence to the left and right directions to which the central longitudinal axis of the taped object 82 turns. If the taped object 82 is curved not only in the longitudinal direction but also in the vertical direction then the rotary annulus 66 may be only longitudinally displaced about the vertical axis which requires a control axis for turning the same also vertically by taking the longitudinal direction in the horizontal plane as an axis of rotation. From the foregoing it will readily be understood that, with taped bodies changing complicatedly in shape, the control about two axes is required for maintaining the plane of revolution precisely normal to the central longitudinal axis of the taped objects. In this case, the directional control in the vertical direction about the axis of rotation disposed horizontally is called hereinafter the "α axis control" while the directional control in the horizontal direction about the axis of rotation disposed vertically is called hereinafter the "β axis control".

It is here to be noted that both the α and β axes can not be provided on the single Z carrier 40 (see FIGS. 1A and 1B) and that there is no choise but to make such a construction that the mechanism of driving either one of the α and β axes, for example, the β axis is provided on the support arm 50 rotatable about the α axis and the other axis is provided on that arm as shown best in FIG. 1A. This causes a complicated problem that a change in control angle about the α axis is attended with a variation in axis of rotation for the β axis. Therefore the control as will be described later is fairly complicated.

The present invention is particularly suitable for use in taping an electric conductor formed into the stator coil of electric rotary machines although the same is not restricted thereto or thereby. In the case, the tape 78 is generally wound around the electric conductor in lap or butt winding relationship. This results in the necessity of advancing the taping head 52 along the central longitudinal axis of the electric conductor of the taped body 78 by one half the width of the tape 78 for the lap winding or the width thereof for the butt winding during each complete revolution of the annulus 66 about the θ axis. When the taped body 82 is straight, the movement of the plane of revolution of the rotary annulus 66 is required only to be controlled to follow a single axis extending along the body 82 after a direction in which the plane of revolution is moved has first coincided with that of the central longitudinal axis of the taped body 82. When the taped body 82 has a shape changed vertically and longitudinally, the rotary annulus 66 should be precisely moved along the central longitudinal axis of the taped body 82 by incremental lengths equal to the width or one half the width of the tape 78 as the case may be and not only in the transverse direction but also in the vertical and longitudinal directions in a composite manner. As a result, it is required to move the rotary annulus 66 along the central longitudinal axis of the taped body 82 in synchronization with the revolution of the annulus 66 about the θ axis while the center of revolution of the annulus 66 always coincides with a corresponding point on the central longitudinal axis of the taped body 82. The control applied to each of those transverse, longitudinal and vertical movements is called hereinafter the X, Y or Z axis control respectively.

In other words, while the rotary annulus 66 is revolving about its axis the same should be freely moved in the longitudinal, transverse and vertical directions and simultaneously the plane of revolution of the annulus 66 must be controlled in turning at will. This means that the rotary annulus 66 is required to be simultaneously controlled with respect to five control axes or the X, Y, Z, α and β axes.

Figure 5:
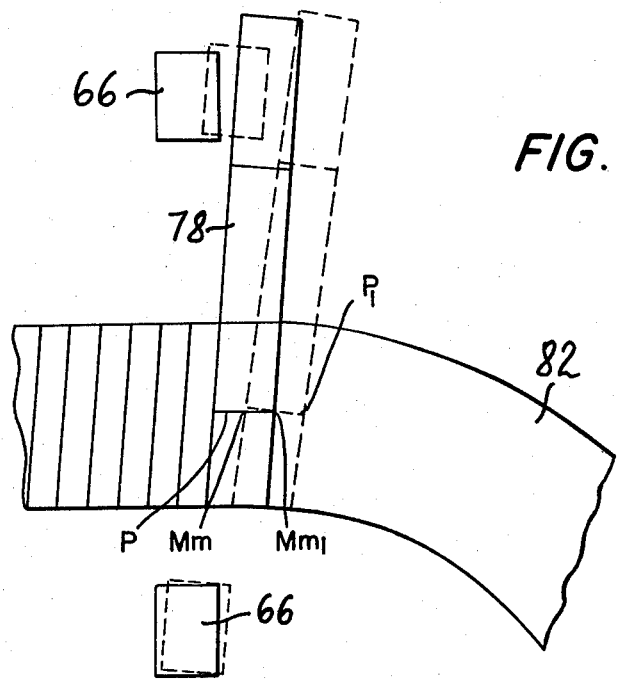
FIG. 5 is a fragmental side elevational view illustrating the positional relationship between the winding tape and the taped body shown in FIGS. 1A and 1B.

When the tape 78 is being wound around the taped body 82, the tape 78 is contacted along a contact line P (see FIGS. 2A, 2B and 5) by the taped body 82 and then wound or twisted around the latter. The contact line P intersects the central line of the tape 78 at a point which is called hereinafter a "contact point" and also designated by the reference character P. In other words, the central longitudinal axis of the taped body 82 is the closest to the central longitudinal axis of the winding tape 78 fed from the feed reel 76 at the contact point P. In FIGS. 2A and 5, the contact point P is shown as lying at a point $M_m$ which is called hereinafter "machine center" (see FIGS. 2A, 2B and 5). It is now assumed that the $\alpha$ and $\beta$ axes pass through the machine center $M_m$.

The taping control will now be described. First, one determines a point on the taped body 82 at which the tape 78 is initiated to be wound around the object 82. That point lies on a contact line P as described above and movements of the rotary annulus 66 relative to the X, Y and Z axes are controlled by the respective motor so as to cause the intersection $M_m$ of the $\alpha$, $\beta$ and $\theta$ axes to coincide substantially with the contact point P thus determined. Then the annulus 66 is controlled with respect to the $\alpha$ and $\beta$ axes by the associated motors to make the plane of revolution of the rotary annulus 66 normal to that portion of the central longitudinal axis of the taped body 82 passing through the point $M_m$. Following this, the $\theta$ motor 72 is operated to revolute the annulus 66 about the $\theta$ axis to initiate the taping operation.

During the taping operation the X, Y and Z axes should be controlled so that the machine center $M_m$ be smoothly moved to the next succeeding machine center $M_{m1}$ (see FIG. 5) along the central longitudinal axis of the taped body 82, by one half the width of tape 78 for the lap winding or the width thereof for the butt winding while the rotary annulus 66 effects one complete revolution about the $\theta$ axis. Simultaneously the $\alpha$ and $\beta$ axes must be controlled so as to render the plane of revolution of the annulus 66 normal to the central longitudinal axis of the taped body 78 at the machine points $M_{m1}$ lying at the next succeeding contact point $P_1$ where the succeeding portion of the tape 78 is initiated to be twisted around the taped object 82. In FIG. 5 dotted line designates the annulus 66 and the tape 78 after the movements as above described and solid line designates them before those movements.

The control process as above described is repeated to revolve alway the rotary annulus 66 about the $\theta$ axis thereby to perform the taping operation.

The movements for the X, Y, Z, $\alpha$, $\beta$ and $\theta$ axes are controlled in accordance with the results of calculations conducted by the small-sized digitial computer 152 (see FIGS. 3 and 4). Before description of the calculations conducted by the digital computer 152, the description will now be made in conjunction of the theoretical background which has led to the fundamental conception of the present invention. One of the necessary conditions required for automatic taping apparatus is to maintain the plane of the revolution of the rotary annulus 66 normal to the central longitudinal axis of the taped body 82. Also, in order to maintain precisely a predetermined pitch with which the tape 78 is wound around the taped body 82, the plane of revolution of the annulus 66 is required to be accurately moved along the central longitudinal axis of the taped body 82 as above described. From the results of researches it has been found that, with those conditions sufficiently and precisely fulfilled, the taping operation can be performed with the satisfactorily good quality even though the annulus 66 would not necessarily coincide in central axis with the taped body 82. This had led to the fundamental principles of the present invention. Therefore it is concluded that, by considering a three-dimensional orthogonal coordinate system with reference to which the central longitudinal axis of the taped body is described, the rotary annulus 66 may travel along each of the X, Y and Z axes thereof in a broken-line manner but not in smooth continuous curve while changing slowly and smoothly in angle about each of the $\alpha$ and $\beta$ axes, those angles defining a plane of revolution of the annulus 66.

Figure 6:
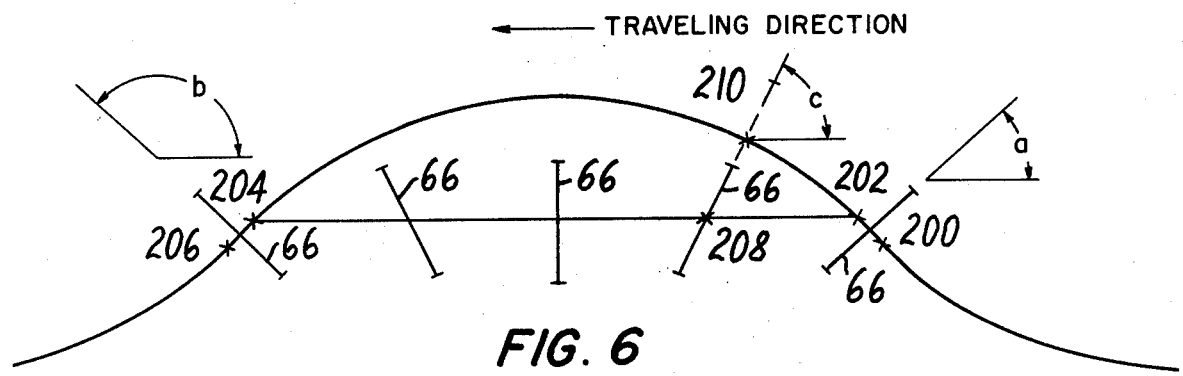
FIGS. 6 through 8 are the most simplified diagrams useful in explaining the taping control operation performed by the arrangement shown in FIGS. 1A and 1B.

The control or movement for the X, Y, Z, $\alpha$, $\beta$ and $\theta$ axes will now be described in more detail with reference to FIG. 6 wherein the central longitudinal axis of the taped body is partly shown as being curved in the plane thereof. It may be said that the curved body is formed of a plurality of circular arcs merging into one another in a plane. In the example illustrated, the curved taped body is formed of three circular arcs merging into one another in the plane of FIG. 6. In FIG. 6 the central circular arc may be defined by points 200, 202, 204 and 206. The point 200 lies at the righthand end as viewed in FIG. 6 of the central arc and defines that portion of the central arc having the sharpest slope in the righthand section thereof with the point 202 adjacent to the point 200. Similarly, the point 206 lying at the lefthand end as viewed in FIG. 6 of the central arc defines the sharpest slope portion of the latter in the lefthand section thereof with the point 204 adjacent to the point 206.

Assuming that the taping head 52 or the rotary annulus 66 travels along the curve shown in FIG. 6 and from the right to the left as viewed in FIG. 6, a position thereof may be controlled to move along the points 200, 202, 204 and 206. Under these circumstances when the position of the rotary annulus 66 have been completed to move from the point 200 to the point 202, the angle of the plane of revolution of the annulus 66 relative the $\alpha$ or $\beta$ axis would coincides with an angle a shown in FIG. 6 as being formed between one side perpendicular to a line connecting the point 200 to the point 202 and the other side parallel to the horizontal line. This means that the angular control or the control of the angle of the plane of revolution of the annulus 66 lags behind the positional control or the control of positions thereof relative to the X, Y and Z axes and results in an error of the control. Therefore, it is required to control that angle concerning the $\alpha$ or $\beta$ axis at the middle point between the points 200 and 202 to be held at the abovementioned angle a. Similarly, it is required to control the angle of the plane of revolution of the annulus at the middle point between the points 204 and 206 to be held at angle b formed between one side perpendicular to a line interconnecting the points 204 and 206 and the other side parallel to the horizontal line as shown in FIG. 6.

In other words, the angular control must be effected so that an angle estimated from data concerning the points 200 and 202 be held upon the position of the annulus 66 reaching the middle point between those points. This is true in the case of the points 204 and 206. In FIG. 6 the annulus 66 at the middle point between the points 200 and 202 has its plane of revolution shown by a segment of a line passing through the middle point and similarly the same at the middle point between the points 204 and 206 has its plane of revolution shown by a segment of a line passing through the middle point.

The rotary annulus 66 may travel between the points 202 and 204 so as to follow a straight line interconnecting those points but not the circular arc extending therebetween while the angle of the plane of revolution thereof is smoothly changed as determined by interpolating angles between the angles a and b and in accordance with corresponding positions of the annulus, the interpolated angles being shown by line segments crossing the line interconnecting the points 202 and 204 at different points and at different angles. For example, the annulus 66 at a point 208 has its plane of revolution tilted at an angle c to the horizontal line and the winding tape 78 contacts the taped body 82 at a point 210.

It is to be understood that the interpolation of angles as above described requires that the inside diameter of the annulus 66 be large enough to be prevented from contacting any circular arc portion of the taped body during the rectilinear travel of the annulus between the points 202 and 204.

Therefore it is seen that the angle of the plane of revolution of the annulus 66 and the pitch with which the tape 78 is wound around the taped body 82 are generally held at accurate values excepting that the central longitudinal axis of the taped body 82 does not coincide with the axis of revolution of the annulus 66.

From the foregoing it is also seen that a calculation and a control section in which the position of the taping head 52 or the annulus 66 is moved are different from those sections in which the plane of revolution of the annulus 60 changes in angle. This gives a great obstruction in that programs are actually prepared for a digital computer involved. In order to avoid this obstruction, a calculation for the actual travel conducted by the digital computer is somewhat modified to be simplified.

Figure 7:
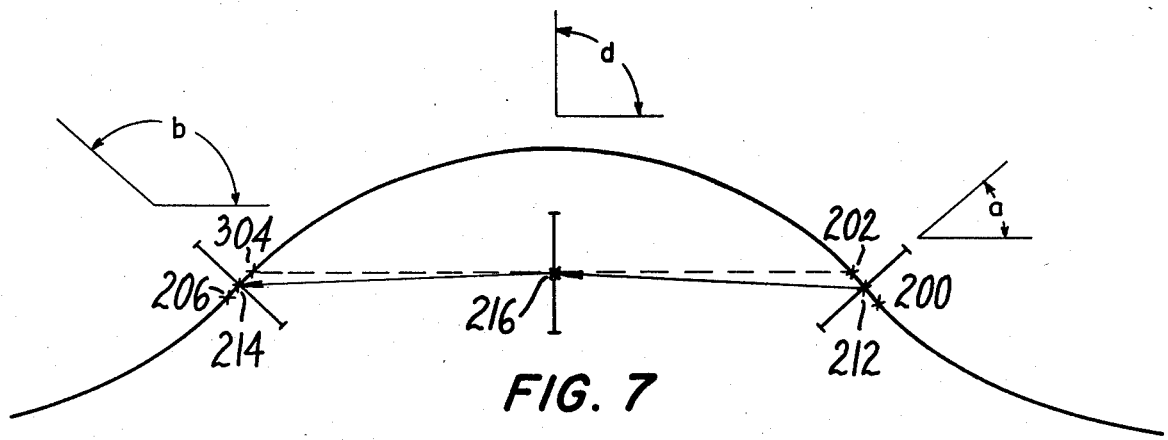
Figure 8:
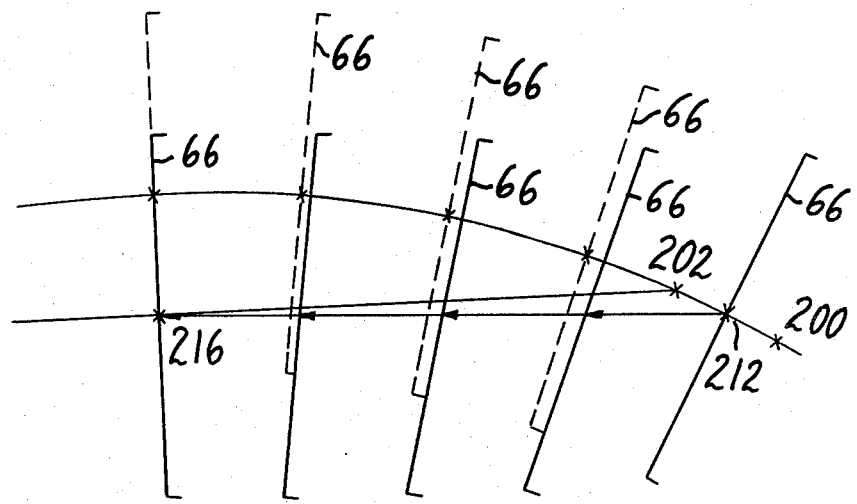

As described above in conjunction with the angle a relating to the middle points between the points 200 and 202, one can use data concerning any pair of adjacent points on the central longitudinal axis of the taped body 82 to calculate an angle of the plane of revolution of the annulus 66 occurring at the middle point between those points. For example, the angle a resulting from the points 200 and 202 represents the angle at the middle point between those points. This is also illustrated in FIG. 7 wherein an angle a appears at the middle point 212 and an angle b appears at the middle point 214. From this it is seen that, by moving the annulus 66 rectilinearly from a point 212 that is the middle point between the points 200 and 202 to a point 216 that is the middle point between the points 202 and 204 and thence to the middle point 214 between the points 204 and 206, the calculation can be facilitated. During this movement of the annulus 66 it is required only to change smoothly the angular position of the annulus 66 from the angle a to the angle d and thence to the angle b.

Where the annulus 66 travels rectilinearly from the point 212 to the point 216 as described above in conjunction with FIG. 7, the position and angle or orientation of the annulus 66 was calculated each time unit time elapsed. Also a similar calculation was made for the annulus 66 traveling precisely along the central circular arc running between the middle points 212 and 214. The results of the calculation are shown in FIG. 8. As the annulus 66 is rectilinearly moved from the point 212 toward the point 216, the same has its position and orientation as shown by each of solid line segments passing at equal intervals through the line extending from the point 212 to the point 216. Dotted line segments show the position and orientation of the annulus 66 precisely moved along the central circular arc.

From FIG. 8 it is seen that the angle or orientation of the annulus is not at all different between the rectilinear and circular movements of the annulus and the pitch is slightly different between both movements. As seen in FIG. 8, a difference in pitch is large adjacent to the starting points of the movements and gradually decreased until it becomes null at the middle point of the movements. It has been found that the simplified calculation is effective with circular arc subtending an angle on the order to 60 degrees at the center thereof for all practical purposes. If it is required to increase the accuracy of the pitch, one may increase the number of points plotting a selected portion of the circular arc. An increase in the number of such plotting points by one can at least halve an error in calculation.

In order to calculate the position and orientation of the annulus 66 of the taping head 52, the memory 158 of the small-sized digital computer 152 has stored therein data representing the central longitudinal axis of the taped body 82 having a complicated shape as described above. More specifically, in order to represent the central longitudinal axis of the taped body 82 referring to a three-dimensional orthogonal coordinate system including an X, a Y and a Z axis extending in the longitudinal, transverse and vertical directions of the taped body 82 respectively, a multiplicity of points lying at predetermined constant intervals on the central longitudinal axis of the taped body 82 are defined by X, Y and Z coordinates equal to distances measured from the origin of the coordinate system fixed at a predetermined position and along the X, Y and Z axes respectively. Assuming that each of curved portions of the taped body 82 is formed of a plurality of circular arcs merging into one another, each pair of adjacent coordinate points are selected to be located in every pair of adjoined circular arcs on both sides of the junctions thereof so as to be capable of expressing a direction of a straight line passing through either end of each circular arc to be in the same plane as and perpendicular to that arc, and still each circular arc is prevented from contacting the inside diameter of the annulus 66. Also, in order to increase the taping accuracy, any number of coordinate points may be additionally put on the central longitudinal axis of the taped body 82 as desired.

As an example, those shape data may be prepared in the following manner: The taped body 82 may be threaded through the rotary annulus 66 having a pair of crossed filaments stretched on the inside thereof and the annulus 66 is moved by driving slowly the X, Y and Z servomotors until the filaments is merely contacted by the taped body 82. At that time, the position of the annulus 66 relative to the X, Y and Z axes gives a coordinate point for the taped body 82 occupying that position. Then each time the annulus 66 has moved a small distance, the abovementioned process is repeated to complete a series of coordinate points describing the central longitudinal axis of the taped body 82 which is, in turn, stored in the memory 158.

Only for purposes of simplification, the description will now be made in terms of the taping head or the annulus 66 traveling adjacent to a coordinate point $O_n$ in a direction directed from the coordinate point $O_n$ to a coordinate point $O_{n+1}$. This travel is equivalent to the actual travel directed from the middle point (which is designated hereinafter by $C_{n-1}$) between points $O_{n-1}$ and $O_n$ to the middle point (which is designated hereinafter by $C_n$) between point $O_n$ and $O_{n+1}$. When the annulus approaches the point $C_{n-1}$, the digital computer conducts the undermentioned calculations to set a command traveling point serving to turn the direction in which the annulus 66 has traveled by that time, to a new direction directed to the point $C_n$.

More specifically, the position selector 152 is operated (A) to select X, Y and Z coordinates for the coordinate points $O_{n-1}$, $O_n$ and $O_{n+1}$ concerning the position of the now traveling annulus 66 being now traveling from the multiplicity of coordinate points stored in the memory 158

(B) to obtain a point $C_n$ that is the middle point between the coordinate points $O_{n+1}$ and $O_n$ by calculating $(X_{n+1}+X_n)/2$ for the X axis, $(Y_{n+1}+Y_n)/2$ for the Y axis and $(Z_{n+1}+Z_N)/2$ for the Z axis, and also a point $C_{n-1}$ that is the middle point between the points $O_{n-1}$ and $O_n$ through similar calculations, and (C) to determine a distance between the points $C_{n-1}$ and $C_n$ by calculating $$(X_{n+1}+X_n)/2 - (X_n+X_{n-1})/2 = (X_{n+1}-X_{n-1})/2$$

for the X axis, $(Y_{n+1}-Y_{n-1})/2$ for the Y axis and $(Z_{n+1}-Z_{n-1})/2$ for the Z axis as well as $$\sqrt{(X_{n+1}-Y_{n-1})^2/4 + (Y_{n+1}-X_{n-1})^2/4 + (Z_{n+1}-Z_{n-1})^2/4}$$

which distance is designated by $l_{(n+1)-(n-1)}$.

Then (D) the command $\alpha$ and $\beta$ axes indicating an inclination of the coordinate point $O_{n-1}$ to the coordinate point $O_n$ is calculated. In this connection it is to be noted that, since the $\beta$ axis is provided on the support arm 50 rotatable about the $\alpha$ axis, the same is affected by a variation of the $\alpha$ axis and therefore of the Z axis. This results in the necessity of using the following especially contrived expressions:

$$\alpha(C_n) = \tan^{-1}\frac{Z_{n+1}-Z_n}{X_{n+1}-X_n}$$

and $$\beta(C_n) = \tan^{-1}\frac{Y_{n+1}-Y_n}{\sqrt{(X_{n+1}-X_n)^2 + (Z_{n+1}-Z_n)^2}}$$

The expressions for $\alpha(C_n)$ and $\beta(C_n)$ are calculated by the command $\alpha$ and $\beta$ generator 166.

The calculations (A), (B), (C) and (D) as described above are conducted with a new command point for the travel direction upon the annulus 66 reaching the middle point between each pair of adjacent coordinate points.

Subsequently the taping head or the annulus continues to travel toward the command travel point thus determined while the control mechanism 160, the coordinate interpolator 164 and the axis interpolator 168 are operated to conduct the following calculations:

(E) First the control mechanism 160 calculates a distance of travel of the rotary annulus 66 for unit time. While the annulus 66 effects one complete revolution about the $\theta$ axis the annulus 66 should move a distance equal to the width of the tape 78 or one half that width as the case may be. Accordingly the determination of the travel distance results in the unequivocal determination of an angle of revolution about the $\theta$ axis of the rotary annulus 66.

(F) When the travel distance for unite time has been determined, the control mechanism 160 also determines a proportional factor K for the distance between the points $C_{n-1}$ and $C_n$ as determined by the calculation (C).

(G) The proportional factor K from the control mechanism 160 is supplied to the coordinate interpolator 164 where a distance of movement along each of the X, Y and Z axes between the points $C_{n-1}$ and $C_n$ is multiplied by the proportional factor K to obtain a distance of movement along each of the X, Y and Z axes for unit time. Referring, for example, to the X axis, the distance between the points $C_{n-1 \, and \, or \, (X_{n+1}-X_{n-1})/2}$ as described above in the calculation (C) is multipled by the proportional factor K to give a distance of movement along the X axis for unit time. Then the actual position of the annulus 66 is added to the calculated distance of movement thereof for unit time to give command positions $X_m$, $Y_m$ and $Z_m$ after unit time referring to the X, Y and Z axes.

(H) The proportional factor K from the control mechanism 160 is also supplied to the axis interpolator 168. Regarding each of the $\alpha$ and $\beta$ axes, the axis interpolator 168 is operated to multiply a difference between an angle at the point $C_{n-1}$ and that at the point $C_n$ resulting from the calculation (D) by the proportional factor K to obtain an angle to which the associated axis is changed for unit time. Then the actual angles of the $\alpha$ and $\beta$ axes are respectively added to the angles thus obtained to give command angles $\alpha$ and $\beta_m$ off the $\alpha$ and $\beta$ axis after unit time.

In this way the command positions $X_m$, $Y_m$ and $Z_m$ of the rotary annulus 66 on the X, Y and Z axes after unit time have been given with the command angles $\alpha_m$ and $\beta_m$ of the $\alpha$ and $\beta$ axes.

Following this calculations are conducted with respect to the servo-loop which will be subsequently described.

(I) As described above in conjunction with FIG. 3, the actual position signals from the position sensors 24, 38, 46, 58, 62 and 74 are converted to corresponding digital signals by the input converter 150 and then entered into the small-sized digital computer 152. In the digital computer 152, the comparator 170 compares the digital actual position signals with the command position and angle signals $X_m$, $Y_m$, $Z_m$, $\alpha_m$ and $\beta_m$ after unit time to produce respective difference signals and integrate those difference signals. The integrated signals serve as command digital speeds of rotation for the associated servomotor 20, 34, 42, 48 60 and 72 respectively and are delivered to the digital-to-analog converter 154.

(J) The digital-to-analog converter 154 converts the command digital signals from the digital computer 152 to corresponding analog signals after which the analog signals are amplified by the servo-amplifier 156. Then the amplified signals are supplied to the associated servomotors 20, 38, 42, 48, 60 and 72 to drive them at the command speeds of rotation respectively.

The calculations conducted by the small-sized digital computer 152 as described above are sorted into three groups. A first one of the groups is conducted by the position selector 162, and the command $\alpha$ and $\beta$ generator 166 and a second one thereof is conducted by the control mechanism 160, the coordinate interpolator 164 and the axis interpolator 168. Finally, the third group is conducted by the comparator 170. Those three groups of the calculations are conducted according to time sharing technique and without any pause. Under these circumstances, a calculation peeriod is long in the order of the third, second and first groups and the priority order of the calculations becomes high in the order of the first, second and third groups.

The foregoing description has been made in conjunction with the method of moving the rotary annulus 66 itself rectilinearly toward the particular command coordinate point. Since this method exhibits the minimum function with the least burden imposed upon a digital computer involved, the use of a somewhat higher grade digital computer (which is high in both calculation speed and storage capacity) can easily increase the control accuracy.

Also in order to decrease errors caused from the rotary annulus traveling rectilinearly from one to another coordinate point, it may be easily practiced to determine finely plotting coordinate points serving as command positions in the course of the rectilinear travel in the following manner: Three or four coordinate points are selected from a series of coordinate points serving as shape data for the particular taped body and simultaneous equations are formed of those selected coordinate points. Then, by solving a quadratic or a cubic equation resulting from the simultaneous equations, the finely plotting coordinate points are determined. The calculation as described above may be conducted in the process of the abovementioned travel. Alternatively it may be conducted on the real time basis according to time sharing techanique. If desired, such coordinate points may be calculated during the suspension of the taping operation and stored in a memory involved.

Similarly a calculations may be conducted with respect to each of the $\alpha$ and $\beta$ axes so that a command change in angle is determined after which a command angle after unit time in the particular travel process is estimated. Then it is possible to obtain command positions of the annulus on the X, Y and Z axes from the command angles thus estimated as by calculating $$\Delta Z = \Delta X \cdot \tan \alpha$$

and $$\Delta Y = \sqrt{\Delta X^2 + \Delta Z^2} \cdot \tan \beta$$

where $\Delta X$, $\Delta Y$ and $\Delta Z$ designate command displacements along the X, Y and Z axes and $\alpha$ and $\beta$ designate the command angle of the $\alpha$ and $\beta$ axes.

The foregoing is only one example of the method of providing all control data required for automatic taping apparatus only from a series of coordinate points having X, Y and Z coordinates describing the central longitudinal axis of the particular taped body in accordance with one aspect of the present invention. In this case the machine center M has been maintained to coincide with the tape contact point P as shown in FIG. 5.

In accordance with the other aspect thereof, the present invention is equally applicable to the non-coincidence of the machine center M with the tape contact point P as shown in FIG. 9A. In the latter case, the tape 78 is arranged to be wound in receiprocating manner around the taped object 82.

FIG. 9A is a side elevational view of one half a modification of the arrangement shown in FIGS. 2A and 2B while FIG. 9B is a fragmental front elevational view of the arrangement shown in FIG. 9A. In the arrangement illustrated the rotary annulus 66 is revolvably held by the annular support plate 64 through a plurality of holding rolls 64a rotatably secured on the outer peripheral edge thereof to protrude therefrom although only two holding rolls 64a are shown in FIG. 9B only for purposes of illustration. The rotary annulus 66 has its inner toothed periphery meshing the driving pinion 68 connected to the $\theta$ motor 72.

Figure 10B:
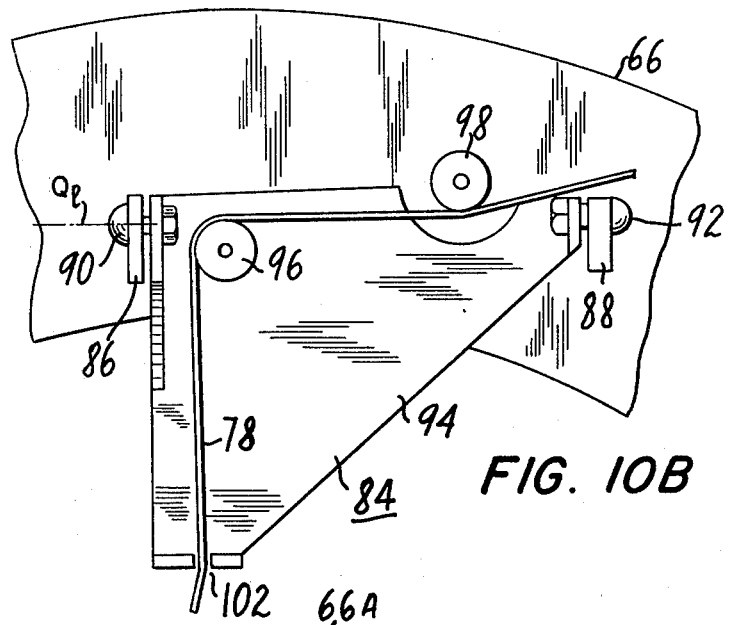

The winding tape 78 from the tape feed reel 76 is delivered to the taped body 82 through an automatic contact angle optimizing mechanism schematically shown at dotted block generally designated by the reference numeral 84 in FIG. 9B. As shown in FIGS. 10A and 10B, the automatic contact angle optimizing mechanism 84 comprises a pair of opposite supporting members 86 and 88 perpendicularly extending from the rotary annulus 66, a pair of pins 90 and 92 perendeiduclarly extending through the supporting members 86 and 88 adjacent to the free ends respectively to be opposite to each other, and a supporting frame 94 rotatably held by the pins 90 and 92. Disposed on the frame 94 are a turning roll 96 and a tensioning roll 98 to be adjacent to the supporting members 86 and 88 respectively. The turning roll 96 contacts substantially the common axis $Q_l$ of both pins 90 and 92 while the tensioning roll 98 contacts that common axis $Q_l$. Further a guide plate 100 is disposed on the frame 94 at that edge remote from the turning roll 96 to be substantially opposite to the latter roll.

As best shown in FIG. 10B, the tape 78 delivered from the feed reel 76 (not shown in FIG. 10B) is trained over the tensioning roll 98 to be put in somewhat tensioned state and then travels substantially along the common pin axis $Q_l$ toward the turning roll 98. After having passed over the roll 98, the tape travels substantially perpendicularly to the common pin axis $Q_l$ and passes through a slit 102 disposed on the guide plate 100 to the body object 82 (not shown in FIG. 10B).

From the foregoing it will readily be understood that the tape contact angle is freely variable in response to the perimeter of the taped body 82, a distance between the taped body 82 and the common axis $Q_l$ of both pins 90 and 92 and the movement of the rotary annulus 66 whereby during the taping operation the tape 78 can be prevented from being distorted and/or slacked due to a change in contact angle resulting from a change in transverse dimension of the taped body 82. In other words, the automatic contact angle optimizing mechanism 84 is operative to maintain always the tape 78 at the optimum angle at which the tape 78 is contacted by the taped object 82.

Also it will readily be understood that the automatic twisting-angle optimizing mechanism 84 may be preferably disposed on the arrangement as shown in FIGS. 2A and 2B with the tensioning roll 80 omitted.

The details of the automatic contact angle optimizing mechanism 84 may be found in U.S. patent application Ser. No. 913,346 assigned to the same assignee as the present application. The pertinent portion of the cited patent application is incorporated herein for reference.

In FIG. 11 a thinner taped body is shown at solid line as having a smaller rectangular cross section designated by 82A and a central longitudinal axis f in the form of a circular arc while a thicker taped body is shown at dotted line as having a larger rectangular cross section designated by 82B and the same central longitudinal axis as the thinner taped body 82A. Upon winding the tape (not shown) around the thinner taped body 82A from the left to the right as viewed in FIG. 11, the tape has its winding start point $Q_A$ and its contact point P lying on the central longitudinal axis f as shown in FIG. 11 while the rotary annulus 66 has its position 66A as shown in FIG. 11. In FIG. 11 the machine center $M_A$ actually lying at the intersection of the $\alpha$ and $\beta$ axes is shown as lying at a point where the line indicating the position 66A of the annulus 66 intersects a tangent g drawn at the point P to the central longitudinal axis f only for purposes of illustration.

The winding start point $Q_A$, the twisting point P and the machine center $M_A$ are also shown in FIG. 9A as lying at points $Q_I$, P and M respectively.

Figure 11A:
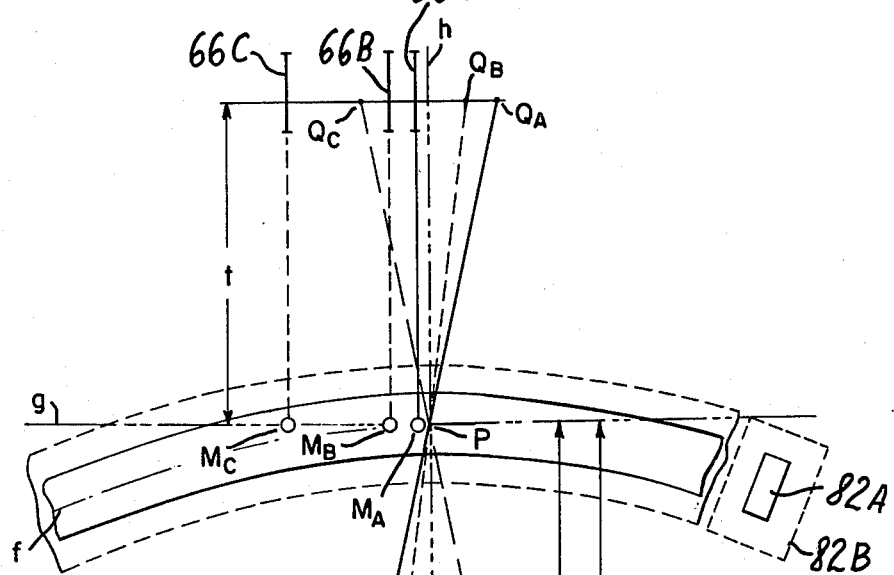
FIG. 11A is a view similar to FIG. 5 but useful in explaining a change in position of the machine center M due to a variation in transverse dimension of a taped body or in tape winding direction.

If the tape is to be wound around the thicker taped object 82A having a larger perimeter with the winding direction and the contact point P remaining unchanged, then it is required to change the winding start point from the position $Q_A$ to its new position $Q_B$ and the annulus 66 from its position 66A to its position as shown in FIG. 11A. Thus the machine center is moved from its position $M_A$ to a position $M_B$ on the tangent g.

Also, upon winding the tape around the thinner taped object 82A from the right to the left as viewed in FIG. 11 with the contact point P remaining unchanged, the annulus 66 has its changed position 66C and hence the machine center changes to its position $M_C$ still lying on the tangent g.

From the foregoing it is seen that a change in perimeter of the taped object must cause machine center to change in position relative to the twisting point P. This is applicable to change in direction of winding of the tape.

FIG. 11 further shows a vertical line h passing through the twisting point P to be perpendicular to the tangent g to the central longitudinal axis of the taped object. Also points $R_A$ and $R_C$ are shown as being at intervals of a perimeter $l_A$ of the thinner taped object 82A from the twisting point P in a downward direction as viewed in FIG. 11 and spaced away from the vertical line h by intervals of the particular winding pitch $l_P$ on the lefthand and righthand sides thereof for purposes as will be apparent later. Similarly a point $R_B$ is shown as being at a distance of a perimeter $l_B$ of the thicker taped body 82B from the point P in the downward direction and spaced away from the vertical line h by a distance of the winding pitch $l_P$ on the lefthand side thereof as viewed in FIG. 11A. As shown in FIG. 11A, the points $R_A$, $R_B$ and $R_C$ lie on extensions of lines connecting the winding start points $Q_A$, $Q_B$ and $Q_C$ to the contact point P respectively.

Figure 12:
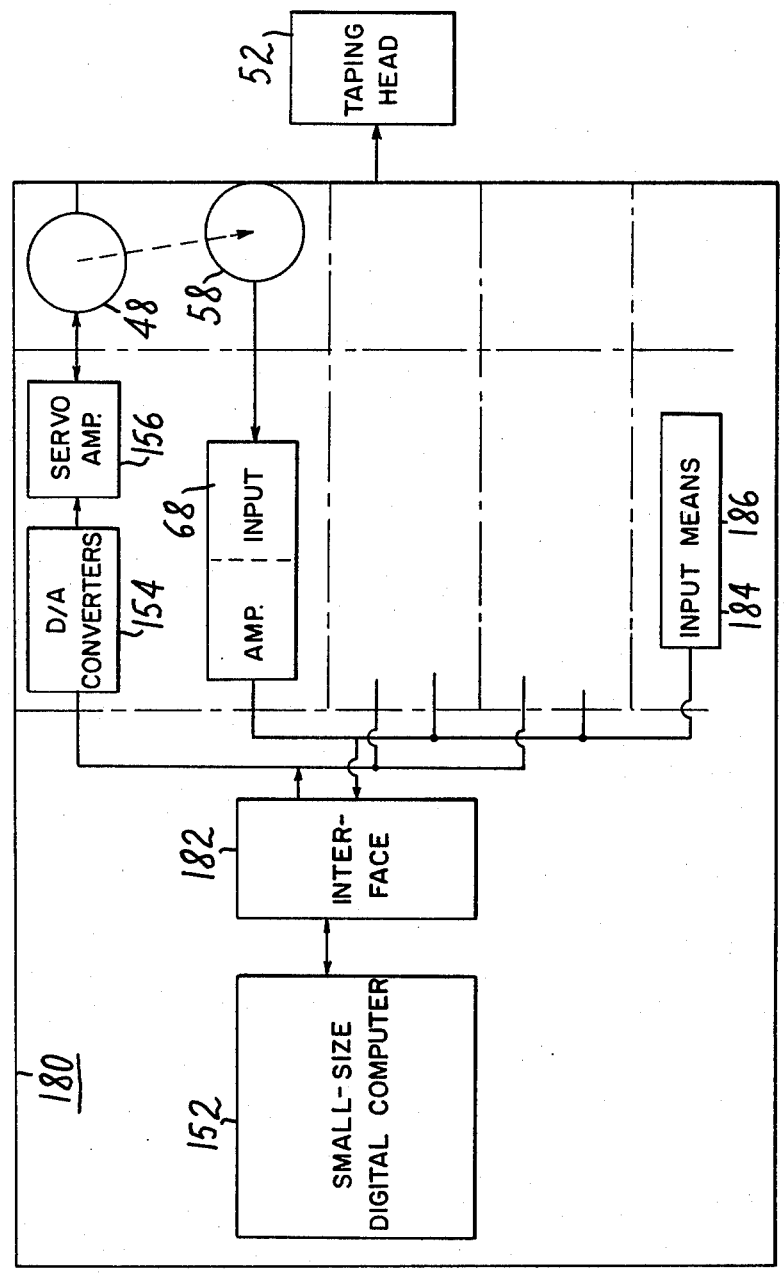
FIG. 12 is a block diagram of a modification of the control means shown in FIG. 3.

FIG. 12 shows a modification of the present invention applied to a distance between the machine center M and the twisting point P variable in accordance with the winding conditions. The arrangement illustrated comprise the taping head 52 and a control unit generally designated by the reference numeral 170 for controlling the taping head 52.

The control unit 180 includes a small-sized digital computer 152 having a storage capacity of about 4 killowords and, an interface assembly 182 operatively coupled to the digital computer 152. The interface assembly 182 is connected to a plurality of digital-to-analog converters 154 one for each DC servomotor for moving the rotary annulus 66 with respect to an associated one of the X, Y, Z, $\alpha$, $\beta$ and $\theta$ axes. Each of the digital-to-analog converters 154 is connected to the associated DC servomotor such as $\alpha$ servomotor 48 through a mating servo-amplifier 156.

Thus the X, Y and Z coordinates and $\alpha$, $\beta$ and $\theta$ values of the rotary annulus 66 are controlled by the small-sized digital computer 152 through the associated digital-to-analog converters, servo-amplifiers 154 and 156 respectively and the mating servomotors respectively.

The actual position and orientation of the rotary annulus 60 relative to those axes are sensed by the associated positional sensors such as the $\alpha$ positional sensor 58 and the sensed actual value signals are amplified by respective input amplifiers 150 until the actual value signals are entered into the small-sized digital computer 152 through the interface assembly 183 which is also supplied with outputs from first and second input means 184 and 186 respectively.

Figure 13:
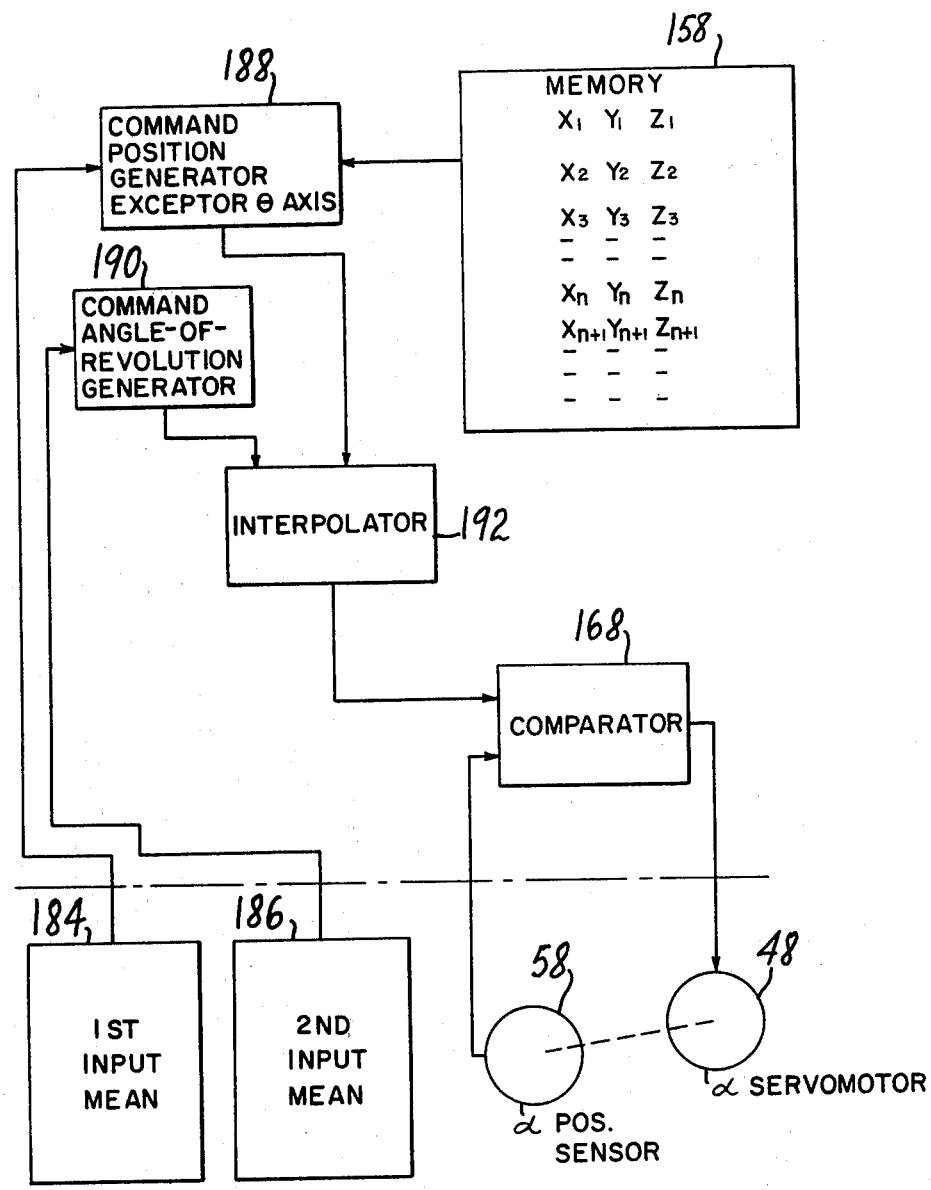
FIG. 13 is a block diagram useful in explaining the function of the arrangement shown in FIG. 12.

As shown in FIG. 13, the small-sized digital computer 152 includes a memory 156 having stored therein shape data of the taped body 82 similar to those stored in the memory 156 shown in FIG. 4. More specifically, the shaped data composed of a multiplicity of coordinate points or plotting points $O_n$ (see FIG. 14) having coordinates $X_n$, $Y_n$ and $Z_n$ (where n=1, 2, 3, ...) referring to the particular three-dimensional orthogonal coordinate system to describe approximately the central longitudinal axis of the taped body as a connection of broken lines. A command position generator 178 is supplied with the taping conditions, that is, the perimeter l of the taped object 82, thickness d of the winding tape 78, and the number of turns m and the direction of winding of the tape 78 through the first input means 184 while it successively read $X_n$, $Y_n$ and $Z_n$ coordinates of the plotting points $O_n$ out from the memory 156. In the example illustrated, when the tape is wound around the taped body from the left to the right as viewed in FIG. 11, the winding of the tape is in a positive direction while when the winding proceeds from the right to the left as viewed in FIG. 11, the winding is in a negative direction. The command position generator 188 produces command positions signals for all the control axes except for the $\theta$ axis in accordance with the taping conditions applied thereto through the first input means 184.

On the other hand, the second input means 186 applies a signal for the actual speed of revolution of the rotary annulus 66 to a command angle-of-revolution generator 190 where a command angle for the $\theta$ axis is generated.

The command positions signals for the X, Y, Z, $\alpha$ and $\beta$ axes from generator 188 and the command angle signal for the $\theta$ axis from the generator 190 are applied to an interpolator 192. The interpolator 192 calculates command position signals for all the control axes except for the $\theta$ axis at time intervals of the unit time on the basis of the command angle signal for the $\theta$ axis from the command angle generator 180. Those command position signals from the interpolator 192 are applied to the comparator 168 where they are compared with actual position signals from the corresponding position sensors such as the $\alpha$ positional sensor 58 to produce difference signals therebetween respectively. The difference signals from the comparator 168 are supplied to the associated servomotors as described above in conjunction with FIG. 12 for the purposes of controlling speeds thereof.

The operation of the arrangement shown in FIG. 13 will now be described with reference to FIG. 14. Assuming that the central longitudinal axis of the particular taped body lies in the ZX plane of a three-dimensional orthogonal coordinate system involved, the central longitudinal axis is designated by the reference character f in FIG. 14 and shown as including coordinate or plotting points $O_1$, $O_2$, $O_3$ and $O_4$ whose coordinates are stored in the memory 156. Each pair of adjacent coordinate points has therebetween the middle point very close to an associated contact point. For example, the middle point $C_1$ is between the coordinate points $O_1$ and $O_2$ and very close to a contact point $P_1$.

Figure 14:
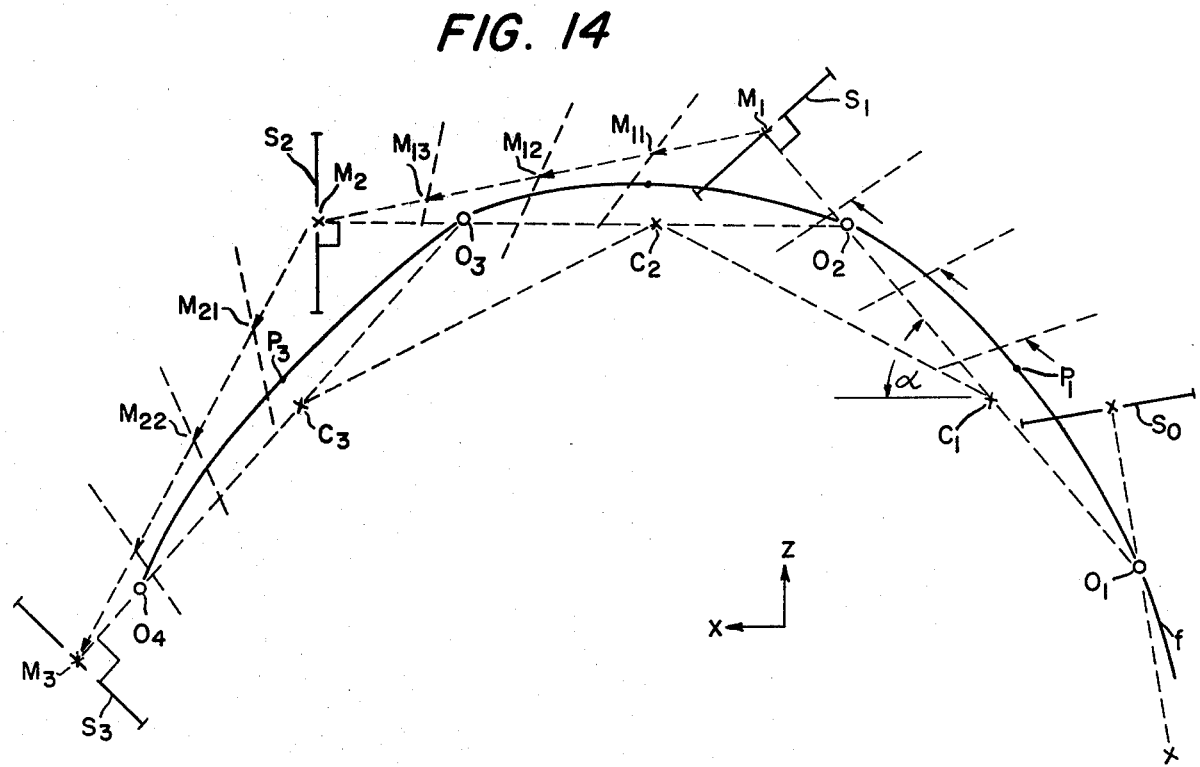
FIG. 14 is a diagram useful in explaining the principles of the taping operation according to the present invention.

Also a machine center $M_1$, $M_2$ or $M_3$ is shown in FIG. 14 as lying in an extension of a line connecting the coordinate points $O_1$ and $O_2$, $O_2$ and $O_3$ or $O_3$ and $O_4$ on the side of the point $O_2$, $O_3$ or $O_4$ remote from the point $O_1$, $O_2$ or $O_3$ respectively.

The rotary annulus is controlled to have its orientation or attitude of revolution at the machine point $M_0$, $M_1$, $M_2$ or $M_3$ as shown by a segment of solid line $S_0$, $S_1$, $S_2$ or $S_3$ in FIG. 14. As shown, the segment of solid line is perpendicular to the dotted line connecting each pair of adjacent coordinate points in which the associated machine center lies.

Figure 11B:
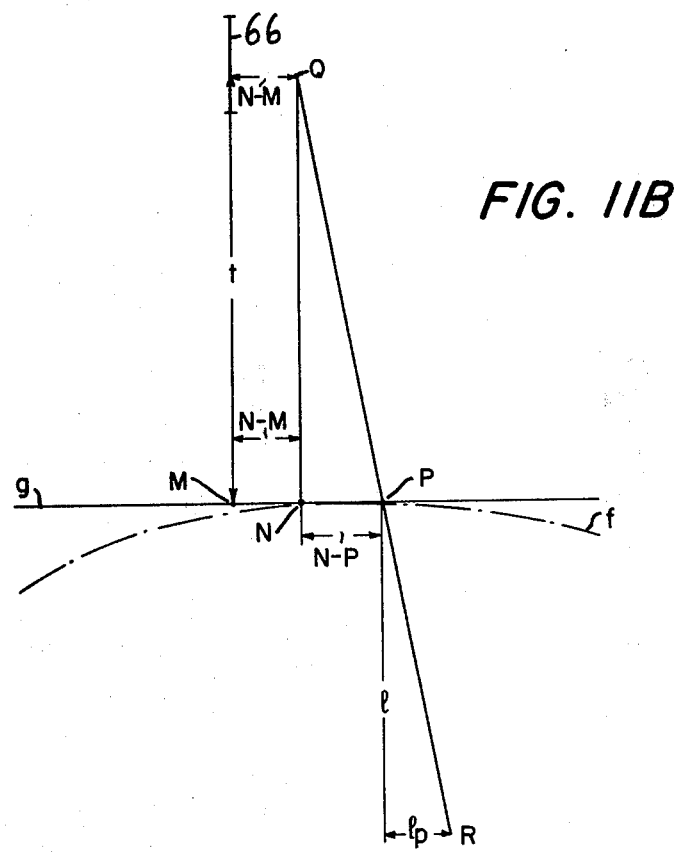
FIG. 11B is a diagram useful in explaining the basic positional relationship among the winding start point O, the machine center M and the tape contact point P shown in FIG. 11A.

For a better understanding of calculations conducted by the digital computer 152, the description will now be made in conjunction with FIG. 11B. FIG. 11B shows the fundamental positional relationship among the contact point P, the machine center M and the winding start point Q as illustrated in FIG. 11A, on the assumption that the tape (not shown) is fed toward the left as viewed in FIG. 11B. In FIG. 11B, a perpendicular from the winding start point Q is drawn to the tangent g to the central longitudinal axis f at the contact point P and a foot thereof is designated by the reference character N. Then a distance between the points N and P designated by $\overline{NP}$ is equal to the product of the length t of the perpendicular $\overline{QN}$ multiplied by the winding pitch $l_P$ divided by the perimeter l of the particular taped body. That is, $$\overline{NP} = t \times l_P/l \qquad (1)$$

holds because the point R lies on the extension of a line connecting the points Q and P as above described in conjunction with FIG. 11A. The point N is also shown in FIG. 9A as being a point at which the position of the common axis $Q_l$ of the pins 90 and 92 in the angle optimizing mechanism 84 is projected on the axis of revolution of the annulus 66.

When the rotary annulus 66 approaches the n-th coordinate point $O_n$, in this case, the coordinate point $O_2$, for example, the command position generator 188 reads X and Z coordinates of coordinate points $O_{n-1}$, $Q_n$ and $O_{n+1}$ such as the points $O_1$, $O_2$ and $O_3$ concerning the actual contact point $P_1$ and therefore the actual position of the rotary annulus 66 out from the memory 158. Then the command position generator 178 conducts the following calculations:

(1) The command position generator 188 calculates a distance between the machine center M and the contact point P on the taped body in accordance with the expression $$\overline{PM} = \overline{NM} \pm \overline{NP} \qquad (2)$$

where $\overline{PM}$, $\overline{NM}$ and $\overline{NP}$ designate distances between the points P and M, between the points N and M and between the points N and P (see FIG. 11B). The distance $\overline{NM}$ has a constant value as read out from the design drawings for the taping head 52 and the distance $\overline{NP}$ is calculated following the expression (1) and has a known value.

However, when the taped body changes in perimeter l, a changed value of the perimeter l enters through the first input means 184 to the command position generator 188 where the distance $\overline{PM}$ is re-calculated. Also the double sign (±) correspond to both directions of winding of the tape and either the plus (+) or minus (−) sign is selected in accordance with the particular winding direction. Thus each time the direction of winding of the tape is inverted, a signal indicating the inverted winding direction enters the command position generator 188 through the first input means 184 to re-calculate the distance $\overline{PM}$.

From the foregoing it is seen that, each time any one of the taping conditions changes, the command position generator 178 re-calculates the distance $\overline{PM}$ in response to a corresponding output from the first input means 184.

(2) Also the command position generator 178 calculates the middle point $C_n$ between the coordinate points $O_n$ and $O_{n+1}$ in accordance with the expressions $$X_{C_n} = (X_{O_n} + X_{O_{n+1}})/2 \qquad (3)$$

and $$Z_{C_n} = (Z_{O_n} + Z_{O_{n+1}})/2 \qquad (4)$$

where $X_{C_n}$ and $Z_{C_n}$ designate an X and Z coordinate of the middle point $C_n$, $X_{O_n}$ and $Z_{O_n}$ those of the coordinate point $O_n$ and $X_{O_{n+1}}$ and $Z_{O_{n+1}}$ designate those of the coordinate point $O_{n+1}$.

As shown in FIG. 14, the middle point $C_n$ is more or less spaced from the central longitudinal axis f but it may be regarded as a corresponding contact point $P_n$ without an error much large.

(3) Further an X and a Z coordinate of the machine center M are calculated from the calculated value and sense of the distance $\overline{PM}$. As described above, the middle point C is close to the associated contact point P and therefore the distance $\overline{PM}$ is substantially equal to a distance $\overline{CM}$ between the points C and M.

Since the plane of revolution of the rotary annulus 66 should be normal to the central longitudinal axis f of the taped body at the contact point P, that central longitudinal axis is parallel to the axis of revolution of the annulus 66. Also the points C and M lie on this axis of revolution of the rotary annulus and therefore the distance $\overline{CM}$ is identical in direction to the central longitudinal axis f of the taped body 82 at the contact point P.

Accordingly, the central longitudinal axis of the taped body at the middle point $C_n$ is directed from the coordinate point $O_n$ to the point $O_{n+1}$ so that the distance $\overline{C_n M_n}$ between the points $C_n$ and $M_n$ has an X and a Z component proportional to an X and a Z component $\Delta X$ and $\Delta Z$ respectively of a distance $\overline{O_{n+1}O_n}$ between the point $O_{n+1}$ and $O_n$. Therefore, the X and Z coordinates of the machine center $M_n$ may be calculated in accordance with the following expressions:

$$X_{M_n} = X_{C_n} + \Delta X \overline{C_n M_n} \qquad (5)$$

and $$Z_{Mn} = Z_{Cn} + \Delta Z \overline{C_n M_n} \quad (6)$$

where $$\Delta X = \overline{X_{O_{n+1}} X_{O_n}} / \overline{O_{n+1} O_n} \quad (7)$$

and $$\Delta Z = \overline{Z_{O_{n+1}} Z_{O_n}} / \overline{O_{n+1} O_n} \quad (8)$$

hold.

(4) In addition, the command position generator 178 calculates a command angle $\alpha_n$ through which the rotary annulus at the machine center M is rotated about the $\alpha$ axis. As the angle $\alpha_n$ of rotation at the machine center $M_n$ is equal to an angle of rotation at a corresponding middle point, the angle $\alpha_n$ is identical to an angle formed between a line passing through the points $O_n$ and $O_{n+1}$ and the X axis as shown as by an angle $\alpha$ relating to the middle point $C_1$ in FIG. 14. Therefore the command angle $\alpha_n$ is calculated in accordance with the following expression:

$$\alpha_n = \tan^{-1} \frac{\overline{Z_{O_{n+1}} Z_{O_n}}}{\overline{X_{O_{n+1}} X_{O_n}}} \quad (9)$$

(5) The processes (1) through (4) as described above are repeated with the next succeeding machine center $M_{n+1}$ to calculate a command X coordinate $X_{M_{n+1}}$ and a command Z coordinate $Z_{M_{n+1}}$ of the machine center $M_{n+1}$ and an a command angle $\alpha_{n+1}$ of rotation for the $\alpha$ axis at the machine center $M_{n+1}$.

(6) On the other hand, the command angle-of-revolution generator 190 receives the actual speed of rotation of the annulus 60 through the second input means 186 to calculate a command angle $\theta_n$ of revolution of the annulus in accordance with the undermentioned expression (10). Assuming that the winding pitch is equal to one half the width of the tape, the annulus 66 travels a distance equal to one half the width of the tape along the taped body during one complete revolution thereof. This results in $$\Delta \theta = \theta_{n+1} - \theta_n = \frac{\overline{P_{n+1} P_n}}{\text{Tape's Width}} \times 2 \quad (10)$$

where $\overline{P_{n+1} P_n}$ designates a distance between contact points $P_{n+1}$ and $P_n$ approximately equal to a distance $\overline{C_{n+1} C_n}$ between the middle points $C_{n+1}$ and $C_n$. The middle point $C_{n+1}$ lies between the corrdinate points $O_{n+2}$ and $O_{n+1}$ while the middle point $C_n$ lies between the points $O_{n+1}$ and $O_n$. Therefore the distance $\overline{C_{n+1} C_n}$ can be calculated in accordance with the following expression:

$$\frac{O_{n+2} + O_{n+1}}{2} - \frac{O_{n+1} + O_n}{2} = \frac{O_{n+2} - O_n}{2} \quad (11)$$

In this way the command positions for all the control axes have been calculated at each of the contact points $P_n$ or $P_{n+1}$ when the tape is wound around the taped body from the point $P_n$ to the point $P_{n+1}$.

Following this, the interpolator 192 is responsive to the command value for all the control axes supplied by the generators 188 and 190 to interpolate command values at equal time intervals of unit time in a section (n, n+1) defined by the middle points $C_n$ and $C_{n+1}$ and between the command values at the machine center $M_n$ and those at the machine center $M_{n+1}$ which will be subsequently described.

(7) The interpolator 192 first calculates a distance of travel of the rotary annulus 66 at equal time intervals of unit time by taking account of time intervals and a rate at which the control is to be effected.

(8) Once the distance of travel for unit time has been calculated, a unit angle of revolution of the annulus 66 is unequivocally determined because the annulus 66 must move one half the width of the tape during one complete revolution thereof.

(9) A proportional calculation is used to calculate the interpolated control values for all the control axes other than the $\theta$ axis from a change in angle for unit time for the $\theta$ axis. For example, machine centers $M_{11}$ through $M_{13}$ and $M_{21}$ through $M_{23}$ (see FIG. 14) have X coordinates $X_{Mnu}$ and Z coordinates $Z_{Mnu}$ calculated at $$X_{Mnu} = X_{Mn} + \frac{(X_{n+1} - X_n)(\theta_u - \theta_n)}{\theta_{n+1} - \theta_n} \quad (12)$$

and $$Z_{Mnu} = Z_{Mn} + \frac{(Z_{n+1} - Z_n)(\theta_\mu - \theta_n)}{\theta_{n+1} - \theta_n} \quad (13)$$

respectively where n=1, 2, and u=1, 2, 3.

A command angle of rotation about the $\alpha$ axis is similarly calculated so that the orientation or attitude or revolution of the annulus 66 is interpolated between the machine centers $M_n$ and $M_{n+1}$. Therefore the rotary annulus 66 is smoothly controlled from its attitude of revolution orientation at the machine cenger $M_n$ to that at the machine center $M_{n+1}$. In FIG. 14 segments of dotted lines passing through the machine centers $M_{11}$, $M_{12}$, and $M_{13}$ show the attitude of revolution of the annulus at equal time intervals of unit time between machine centers $M_1$ and $M_2$ and segments of dotted lines passing through the machine centers $M_{21}$, $M_{22}$ and $M_{23}$ show successively changed attitudes thereof between the machine center $M_2$ and $M_3$.

While the present invention has been illustrated and described in conjunction with the two-dimensional control it is to be understood that the same is equally applicable to the three-dimensional control. In the latter case, the control should be additionally effected with respect to the Y and $\beta$ axes. Therefore a distance L of movement of the contact point is calculated in accordance with the expression $$L = \sqrt{\Delta X^2 + \Delta Y^2 + \Delta Z^2}$$

where $\Delta X$, $\Delta Y$ and $\Delta Z$ designate an X, a Y and a Z component of that distance. Also a command angle $\beta$ of rotation about the $\beta$ axis is given $$\beta = \tan^{-1} \frac{\Delta Y}{\sqrt{\Delta X^2 + \Delta Z^2}}$$

In other respects, the three-dimensional control is substantially similar to the two-dimensional control.

With the machine center spaced away from the contact point, it is seen from the foregoing that the present invention first calculates a distance between the machine center and the contact point as a function of the abovementioned taping conditions which are externally entered into a digital computer involved. Then a command travel and a command attitude of revolution of the annulus are calculated from the calculated distance and coordinate points stored in the digital computer to describe a shape of the taped body with the interpolation suitably effected between each pair of adjacent coordinate points. Therefore, upon the occurrence of a change in perimeter of the taped body or in direction of winding of the tape, the command travel and attitude of revolution of the annulus can be immediately modified only by using, for example, an operating dial to enter this change into the digital computer whereby the taping can continue to be properly effected.

The present invention has several advantages. For example, the tape can be easily and automatically wound not only around the straight body to be taped but also around the taped body curved in two- or three-dimensional manner. The winding of the tape can be easily effected in the forward and reverse directions. In the latter case, when the tape reaches a position on the taped body where the winding terminates, the winding can continue as it is and only by reversing the direction of winding of the tape without the tape fixed to the taped body. This facilitates the multilayer winding. In the multilayer winding, the taped body has cross sectional dimension or a perimeter gradually increased. According to the present invention, however, the tape can be neatly wound around such a taped body with a predetermined pitch. Therefore, the present invention eliminates the neccessity of performing manual operations of fixing the tape to the taped body at the end of the winding by means of an adhesive tape in order to prevent the unwinding of the wound tape, returning the rotary annulus back to its winding initiating position, securing the tape to the taped body at the beginning of the winding and so on. Accordingly the efficiency can at least nearly tripple as compared with the single direction winding.

Further the present invention can form the necessary control data only of coordinates points describing the central longitudinal axis of the taped body referring to the particular coordinate system and the taping conditions as described above so that a digital computer can have a low storage capacity enough to be capable of being integrally assembled into the taping head. This eliminates the necessity of punching a length of paper tape with a new locus of travel of the taping head by using a high storage capacity digital compater each time one taping operation has been completed. Accordingly a completely automatic taping apparatus can be provided.

While the present invention has been illustrated and described in conjunction with a few preferred embodiments thereof it is to be understood that numerous changes and modifications may be resorted to without departing from the spirit and scope of the present invention. For example, the calculations of the present invention as described above may readily be modified to fit in the case the intersection of the $\alpha$ and $\beta$ axes does not lie on the $\theta$ axis. Also the central longitudinal axis of the taped body may approximate to the connection of circular arcs but not to the connection of broken lines. In the latter case, an associated digital computer may be required to increase more or less in storage capacity as compared with the approximation to the connection of broken lines. Further the winding pitch may be selected at will.

What we claimed is:

1. An automatic taping apparatus, comprising:

a rotatable member movable, in operation, along the length of an object to be taped and rotatable about the object to be taped;

means mounting said rotatable member for movement along the length of an object to be taped and for rotation about the object to be taped and for rotation about two orthogonal radial axes of said rotatable member;

position sensing means for sensing the position and rotation angles of said rotatable member and for generating position and angle signals representative thereof;

tape feed means on said rotatable member for feeding a winding tape to tape an object in use as said rotatable member travels along and rotates about the object to be taped;

position control means responsive to control signals for controlling a spatial position of said rotary member, said position control means including angular control means for controlling an angle of revolution $\theta$ of said rotary member and for controlling respective angles of rotation $\alpha$ and $\beta$ about the two orthogonal radial axes of said rotary member;

a computer, said computer including memory means for preliminarily storing shape data of a body to be taped in the format of a multiplicity of sets of coordinates $\{(X_1,Y_1,Z_1), (X_2,Y_2,Z_2). \ldots, (X_n,Y_n,Z_n)\}$ referring to a three-dimensional orthogonal coordinate system, means for reading successive coordinates of said stored set of coordinates and for calculating command coordinates $(X_m,Y_m,Z_m)$ and command angles ($\alpha_m$, $\beta_m$ and $\theta_m$) to which said rotatable member is moved during a unit of time, and comparator means receptive of the position and angle signals from said position sensing means for comparing the command coordinates and angles with the actual coordinates and angles of said rotary member and for generating control signals applied to said position control means to maintain a plane of revolution of said rotary member substantially normal to a longitudinal axis of a body to be taped as said rotatable member is moved along the length of the body to be taped.

2. An automatic taping apparatus as claimed in claim 1 wherein said positional control means includes a first movable member movable along a first one of three orthogonal axes of said three-dimensional orthogonal coordinate system with respect to a bed plate, a second movable member movable along a second one of said three orthogonal axes with respect to said first movable member, a third movable member movable along a third one of said three orthogonal axes with respect to said second movable member, driving means one for each of said movable members responsive to a corresponding one of said control signals from said computer means to drive the associated movable member, and positional sensor means one for each of said movable members for sensing a position of the associated movable member.

3. An automatic taping apparatus as claimed in claim 2 wherein said angular control means includes a rotatable supporting arm rotatable about a first axis disposed on said third movabel member, a taping head supported by said supporting arm for rotation about a second axis disposed on said arm, said rotatary member being disposed on said taping head for rotation about a third axis disposed on said taping head, and driving means operatively associated with said taping head and rotary member respectively, each of said driving means responding to a corresponding one of said control signal from said computer means to drive a mating one of said taping head and rotary member.

4. An automatically taping apparatus as claimed in claim 3 wherein said first axis is orthogonal to said second axis.

5. An automatic taping apparatus as claimed in claim 1 wherein said computer includes interpolator means for interpolating a plurality of sets of command angles at equal time interals of unit time between a set of command angles ($\alpha_m$, $\beta_m$) and the next succeeding set of command angles ($\alpha_{m+1}$, $\beta_{m+1}$) so that said rotary member has a attitude of revolution smoothly changed from that defined by said set of command angles to that corresponding to said next succeeding set of command angles.

6. An automatic taping apparatus as claimed in claim 1 wherein a selected one of control axes with respect to which the spatial position of said rotary member is controlled lies substantially in line with a selected one of control axes about which said rotary member is controllably rotated, and wherein said computer includes a position selector for reading successively two adjacent sets of coordinates $\{(X_n, Y_n, Z_n)$ and $(X_{n+1}, Y_{n+1}, Z_{n+1})\}$ out from said memory means in response to actual positions of said rotary member, taping control means for generating a measure of a taping speed, and calculation means for calculating said command coordinates ($X_m$, $Y_m$, $Z_m$) and said command angles ($\alpha_m$, $\beta_m$ and $\theta_m$) according to $$X_m = X_{n+1} - X_n, \; Y_m = Y_{n+1} - Y_n, \; Z_m = Z_{n+1} - Z_n$$

$$\alpha_m = \tan^{-1} Z_m/X_m, \; \beta = \tan^{-1} \Delta Y/\sqrt{\Delta X^2 + \Delta Z^2} \text{ and}$$

$$\theta_m = \sqrt{X_m^2 + Y_m^2 + Z_m^2} \text{ / tape winding pitch}$$

where $\Delta X$, $\Delta Y$ and $\Delta Z$ designate an X, a Y and a Z component of a displacement of said rotary member effected during every unit time.

7. An automatic taping apparatus as claimed in claim 1 wherein a selected one of control axes with respect to which the spatial position of said rotary member is controlled lies substantially in line with a selected one of control axes about which said rotary member is controllably rotated, and the taped body is turned in direction at a coordinate point ($X_n$, $Y_n$, $Z_n$) put between coordinate points ($X_{n+1}$, $Y_{n+1}$, $Z_{n+1}$) and ($X_{n-1}$, $Y_{n-1}$, $Z_{n-1}$) and wherein said computer includes a position selector for reading successively X, Y and Z coordinates ($X_{n-1}$, $Y_{n-1}$, $Z_{n-1}$), ($X_n$, $Y_n$, $Z_n$) and ($X_{n+1}$, $Y_{n+1}$, $Z_{n+1}$) from said memory means when said rotary member approaches the coordinate point ($X_{n-1}$, $Y_{n-1}$, $Z_{n-1}$), and calculation means for calculating said command coordinates ($X_m$, $Y_m$, $Z_m$) according to $$X_m = \frac{X_{n+1} + X_n}{2} - \frac{X_n + X_{n-1}}{2} = \frac{X_{n+1} - X_{n-1}}{2}$$

$$Y_m = \frac{Y_{n+1} + Y_n}{2} - \frac{Y_n + Y_{n-1}}{2} = \frac{Y_{n+1} - Y_{n-1}}{2} \text{ and}$$

$$Z_m = \frac{Z_{n+1} + Z_n}{2} - \frac{Z_n + Z_{n+1}}{2} = \frac{Z_{n+1} - Z_{n-1}}{2}$$

and also calculating said command angles ($\alpha_m$, $\beta_m$ and $\theta_m$) according to $$\alpha_m = \tan^{-1} Z_m/X_m, \; \beta_m = \tan^{-1} \Delta Y \sqrt{\Delta X^2 + \Delta Z^2} \text{ and}$$

$$\theta_m = \sqrt{X_m^2 + Y_m^2 + Z_m^2} \text{ / tape winding pitch}$$

where $\Delta X$, $\Delta Y$ and $\Delta Z$ designate an X, a Y and a Z component of a displacement of said rotary member effect during each unit time.

8. An automatic taping apparatus as claimed in claim 1 wherein said winding tape has a contact point on the body to be taped lying at the middle point located between each pair of adjacent coordinate points having respective coordinates ($X_n$, $Y_n$, $Z_n$) and ($X_{n+1}$, $Y_{n+1}$, $Z_{n+1}$) where n=1, 2, 3 ..., and wherein said computer includes a command position generator supplied with the taping conditions and reading successively X, Y and Z coordinates of said coordinate points to calculate command position signals for the X, Y, Z, $\alpha$ and $\beta$ axes, a command angle-of-revolution generator supplied with the actual speed of revolution of said rotary member to generate a command angle signal for the $\theta$ axis, and an interpolator connected to both said command position generator and said command angle-of-revolution generator to calculate command position signals for the X, Y, Z $\alpha$ and $\beta$ axes at time intervals of unit time on the basis of said command angle signal for the $\theta$ axis, and said comparator means comparing said command position signals from said interpolator with the actual position signals of said rotary member to produce control signals, said positional and angular control means being responsive to said control signals from said comparator means to control said rotary member so that said two radial axes thereof intersect each other at a predetermined point in a straight line passing through said pair of adjacent coordinate points and the axis of revolution of said rotary member lies substantially in said straight line.

9. An automatic taping apparatus as claimed in claim 1 wherein said winding tape has a contact point on the body to be taped lying in a curve interconnecting each pair of adjacent coordinate points having respective coordinates ($X_n$, $Y_n$, $Z_n$) and ($X_{n+1}$, $Y_{n+1}$, $Z_{n+1}$) where n=1, 2, 3 ..., and wherein said computer includes a command position generator supplied with the taping conditions and reading successively X, Y and Z coordinates of said coordinate points to calculate command position signals for the X, Y, Z, $\alpha$ and $\beta$ axes, a command angle-of-revolution generator supplied with the actual speed of revolution of said rotary member to generate a command angle signal for the $\theta$ axis, and an interpolator connected to both said command position generator and said command angle-of-revolution generator to calculate command position signals for the X, Y, Z, $\alpha$ and $\beta$ axes at time intervals of unit time on the basis of said command angle signal for the $\theta$ axis, and said comparator means comparing said command position signals from said interpolator with the actual position signals of said rotary member to produce control signals, said positional and angular control means being responsive to said control signals from said comparator means to control said rotary member so that said two radial axes thereof intersect each other at a predetermined point in a straight line passing through said pair of adjacent coordinate points and the axis of revolution of said rotary member lies substantially in said straight line in a tangent to said curve and the axis of revolution of said rotary member lies substantially in said tangent.

* * * * *